(12) United States Patent
Jang et al.

(10) Patent No.: US 7,218,081 B2
(45) Date of Patent: May 15, 2007

(54) POWER SYSTEM HAVING MULTIPLE POWER CONVERTERS WITH REDUCED SWITCHING LOSS

(75) Inventors: Yungtaek Jang, Cary, NC (US); Milan M. Jovanovic, Cary, NC (US)

(73) Assignee: Delta Electronics, Inc., Neihu, Taipei (TW)

( * ) Notice: Subject to any disclaimer, the term of this patent is extended or adjusted under 35 U.S.C. 154(b) by 279 days.

(21) Appl. No.: 10/834,238

(22) Filed: Apr. 29, 2004

(65) Prior Publication Data

US 2005/0243579 A1 Nov. 3, 2005

(51) Int. Cl.
*G05F 1/563* (2006.01)

(52) U.S. Cl. .................. 323/266; 323/222; 363/21.04; 363/21.12; 363/65

(58) Field of Classification Search ................ 323/222, 323/266, 271, 282; 363/21.03, 21.04, 21.06, 363/21.12, 21.14, 65, 89
See application file for complete search history.

(56) References Cited

U.S. PATENT DOCUMENTS

| | | | | |
|---|---|---|---|---|
| 3,742,330 A | * | 6/1973 | Hodges et al. ................ | 363/41 |
| 4,251,857 A | * | 2/1981 | Shelly .......................... | 363/26 |
| 4,533,986 A | * | 8/1985 | Jones .......................... | 363/17 |
| 4,675,796 A | * | 6/1987 | Gautherin et al. ............. | 363/20 |
| 4,686,615 A | * | 8/1987 | Ferguson ...................... | 363/17 |
| 4,761,722 A | * | 8/1988 | Pruitt .......................... | 363/17 |
| 5,272,613 A | * | 12/1993 | Buthker ..................... | 363/21.1 |
| 5,406,471 A | * | 4/1995 | Yamanaka .................. | 363/124 |
| 5,570,276 A | * | 10/1996 | Cuk et al. ..................... | 363/16 |
| 5,844,399 A | * | 12/1998 | Stuart .......................... | 323/282 |
| 6,008,631 A | * | 12/1999 | Johari ......................... | 323/266 |
| 6,061,253 A | * | 5/2000 | Igarashi et al. ............... | 363/19 |
| 6,198,260 B1 | * | 3/2001 | Wittenbreder ............... | 323/271 |
| 6,400,579 B2 | * | 6/2002 | Cuk .............................. | 363/16 |
| 6,650,552 B2 | * | 11/2003 | Takagi et al. ................. | 363/17 |
| 6,798,177 B1 | * | 9/2004 | Liu et al. ..................... | 323/222 |
| 6,961,254 B2 | * | 11/2005 | Tamura ........................ | 363/89 |

* cited by examiner

*Primary Examiner*—Jeffrey Sterrett
(74) *Attorney, Agent, or Firm*—Venable LLP; Robert Babayi

(57) ABSTRACT

The present invention includes multiple power converters for driving one or more loads via an input power source, AC or DC. A first switching power converter has first one or more windings coupled to an input power source, and a second switching power converter having second one or more windings coupled to one or more loads. A magnetic device comprising a single integrated magnetic core couples the first one or more windings to the second one or more windings for reducing switching loss.

12 Claims, 28 Drawing Sheets

[T₀ - T₁]

[T₁ - T₂]

[T₂ - T₃]

[T₃ - T₄]

[T$_4$ - T$_5$]

[T$_5$ - T$_6$]

[T₆ - T₇]

[T₇ - T₈]

[T$_8$ - T$_9$]

[T$_9$ - T$_{10}$]

POWER SYSTEM HAVING MULTIPLE POWER CONVERTERS WITH REDUCED SWITCHING LOSS

CROSS-REFERENCE TO RELATED APPLICATIONS

This patent application is related to copending patent application ("Co-pending Application") entitled "Soft-Switched Power Converters," Ser. No. 10/445,111, filed on May 23, 2003, assigned to Delta Electronics, Inc., which is also Assignee of the present patent application. The Co-pending Application is hereby incorporated by reference in its entirety into this Application.

BACKGROUND OF THE INVENTION

1. Field of the Invention

This invention relates to the field of power systems, and more particularly, to power systems that reduce switching losses.

2. Description of the Prior Art

The majority of power system's used in modern data processing and telecom equipment use multiple power conversion stages, for example switching power converters. The multiple stages can include a rectifier stage, front-end PFC boost converter stage, DC-DC output stage, and stand-by power stage. One important consideration in the design of such power systems is Power Factor Correction (PFC), a power conversion measure related to line-current harmonics. More specifically, PFC is a measure of how the voltage waveform follows the current waveform, a factor that can cause line-current harmonics.

FIG. 1 shows a conventional multi-stage power system 100. As shown, the system 100 includes a rectifier stage 102, a front-end PFC boost converter stage 104, a DC-DC output stage 106 and a stand-by power stage 108. The rectifier stage 102 includes a rectifier and a filter coupled to an input voltage source $V_{IN}$ to provide a rectified voltage to the front-end PFC boost converter stage 104. The front-end PFC boost converter stage 104 reduces the line-current harmonics in order to allow compliance with various worldwide specifications governing the harmonic limits, for example, as defined by IEC. The DC-DC output stage 106 is a dc-to-dc conversion stage for providing one or more output DC voltages $V_{O1}, V_{O2}, \ldots V_{On}$. The stand-by power supply stage 108 provides housekeeping power and ensure system functionality when the system is in low-power (stand-by or sleep) mode and the main power is shut down to reduce power consumption.

A preferred topology at higher power levels is known as continuous-conduction-mode (CCM) boost converter stage. A CCM is a mode when the boost converter stage exhibits reverse recovery characteristics associated with its rectifier. In recent years, significant efforts have been made to improve the performance of high-power boost converters by addressing the adverse effects of reverse recovery. The majority of these development efforts have been focused on increasing power conversion efficiency and electromagnetic compatibility (EMC).

Soft-switching is one way of reducing reverse-recovery-related to switching losses and EMC problems. Switching loss in a switch is loss associated with the product of voltage and current through a switch at switching instance. Soft-switching is accomplished by controlling the switching instants during intervals when voltage or current through the switch are near zero. When the voltage at the switching instant is near zero, the soft-switching is called zero-voltage switching or ZVS. On the other hand, when the current at the switching instant is zero, the soft-switching is called zero-current switching or ZCS.

Conventional soft-switched boost converters use passive or active snubber circuits that control the rectifier switching rate. For example, FIG. 2 shows a boost converter stage disclosed in the Co-pending Application that uses an active snubber circuit. The shown soft-switched boost converter uses inductor $L_S$ to store energy for creating ZVS conditions for switch S. In FIG. 2, a transformer TR provides the reset of the current in Ls for creating ZCS conditions for switch S1.

The DC-DC Output stage 106 provides a regulated output voltage. This stage also provides isolation between the output and the preceding stages of the power system. Generally, the DC-DC output stage 106 can be implemented with any isolated converter topology, for example, single ended topology and multiple switch topology. Examples of these topologies include forward, flyback, push-pull, or bridge-type converter topologies. The topology selection is primarily based on considerations of output power level and often require balancing of performance vs. cost. Typically, for higher power levels (e.g., above 600 W), multiple switch topologies such as the two-switch forward, half-bridge, and full-bridge converters are employed. For lower power levels (e.g., below 300 W), single switch topologies such the flyback and forward converters are used. At medium power levels in the range from 300 W to 600 W, the two-switch forward topology is popular for its simplicity and relatively good performance. This is because a two-switch forward converter does not require separate transformer reset circuitry and the maximum stress on its primary-side switches is limited to the maximum input voltage. FIG. 3 shows the DC-DC Output Stage 106 implemented using a conventional two-switch forward converter.

FIG. 4 shows the stand-by power supply stage 108 implemented using the flyback topology, which has a low part count and the ability to operate efficiently in a wide input-voltage range. It is known to reduce the power consumption of the power supply 108 by turning off the boost converter front end stage 104. In some cost-critical applications, the stand-by flyback converter of FIG. 4 is implemented without using a controller, i.e., it is implemented as a self-oscillating converter.

There has been a need to decrease the size of power systems, including power conversion equipment. Advanced packaging and thermal management techniques have been used in power systems that operate at higher switching frequencies. A further size reduction has been achieved through component integration, for example, integrating semiconductor switches with drive, control and/or supervisory circuits and/or by integrating magnetic components such as transformers and inductors on the same core.

However, there still exists a need to further reduce the size of power systems beyond what is known in the art.

SUMMARY OF THE INVENTION

The present invention includes multiple power converters for driving one or more loads via an input power source, AC or DC. A first switching power converter has first one or more windings coupled to an input power source, and a second switching power converter has second one or more windings, e.g., serially or parallel coupled windings, coupled to one or more loads. A magnetic device comprising a single integrated magnetic core couples the first one or more windings to the second one or more windings for reducing switching losses. Preferably, a controller regulates the one or more loads, for example, by causing periodic switching at a constant frequency at the same instant of time. Also, the magnetic device can isolate the first switching power converter from the second switching power converter.

According to some of the more detailed features of the invention, the first switching power converter comprises a boost converter having an active snubber circuit, including a buck converter, a buck-boost converter, and a dc-input two-inductor boost converter. The second switching power converter comprises at least one of a front-end power converter, an output power converter, and a power supply. The second switching power converter can also comprise a plurality of output power converters having cross regulated outputs. Examples of such converters include a two-switch forward converter a flyback converter, a SEPIC converter, a dual SEPIC converter, and a CUK converter.

According to other more detailed features of the invention, the switching loss is reduced by at least one of ZVS and ZCS. At least one of the first switching power converter and second switching power converter comprise a rectifier, a filter, a boost switch and an auxiliary switch. The rectifier can comprise any one of diodes, secondary-side diode rectifier, or a synchronous rectifier.

DETAILED DESCRIPTION OF THE INVENTION

In accordance with the present invention, multiple power conversion stages use a common magnetic device for reducing switching losses. In the preferred embodiment, for reducing switching losses, a soft switching method diverts current from and/or provides zero-voltage intervals during switching instants to achieve ZCS and ZVS. ZVS occurs when near zero-voltage is provided during a switching instant and ZCS occurs when current is diverted during a switching instant to provide near zero current.

As such, the present invention employs a magnetic approach that uses a magnetic device with a single integrated core for providing soft-switching in a power system. As a result, the number of magnetic components can be reduced by utilizing the same magnetic component in at least two power conversion stages. For example, one transformer can be used to provide magnetic coupling integration between the boost converter and the DC-DC output converter. In another exemplary implementation, the invention can be used for magnetic coupling integration of the boost converter and any stand-by power supply, or any other kind of power supply.

Accordingly, a single magnetic device, for example a transformer, is mutually shared by two power conversion stages to simultaneously create conditions for soft switching and preferably to isolate two or more power converters from each other. For example, the transformer can be utilized to simultaneously create conditions for soft switching of one power conversion stage and to provide isolation with another power stage. In one exemplary embodiment, the transformer is used to create conditions for soft switching in a boost converter snubber circuit that is integrated with an isolation transformer of a two-switch forward converter DC-DC output stage. The transformer can also isolate the boost converter and the DC-DC output stage from each other. In this integrated boost and two-switch forward converter power stages, all active semiconductor switches are soft switched, i.e., the two-switch forward converter is also soft-switched. In another embodiment, the transformer of the front-end boost converter has an active boost converter snubber circuit that is integrated with the isolation transformer of a flyback converter.

Many other embodiments of the circuit of this invention are possible. For example, the power system of the invention can have multiple outputs implemented as additional windings on a mutually shared transformer. Finally, the invention can be used in applications with an AC input, as well as in applications with a DC input.

Figure 1:
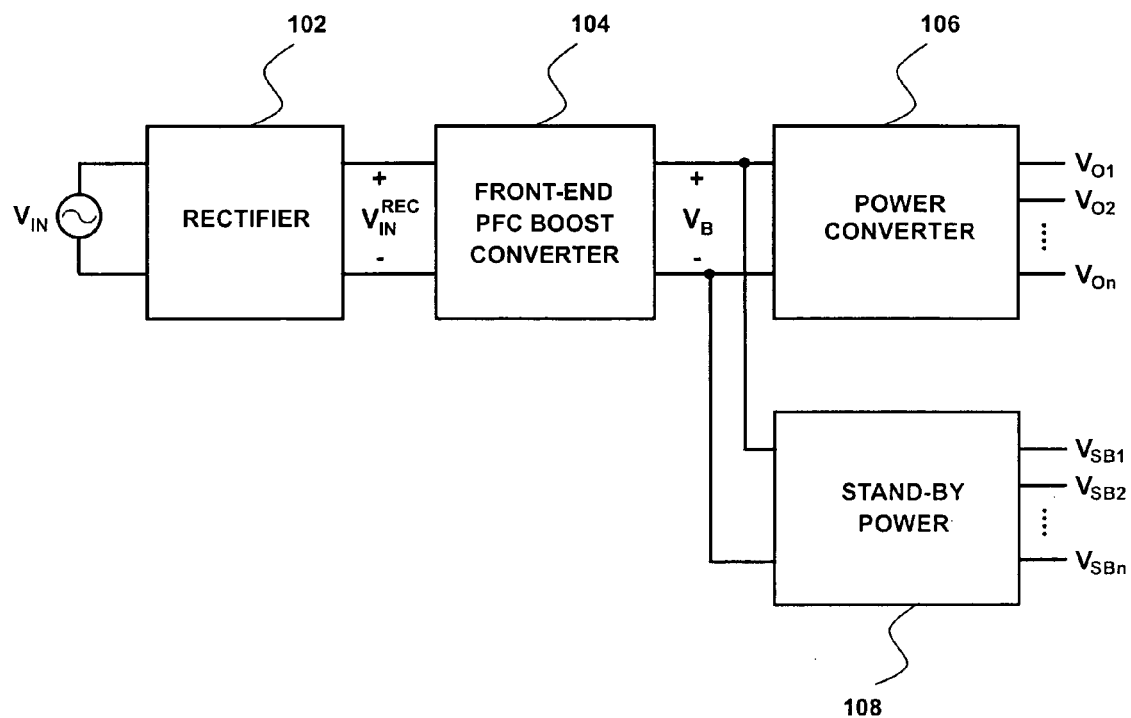
FIG. 1 shows block diagram of a power system.
Figure 2:
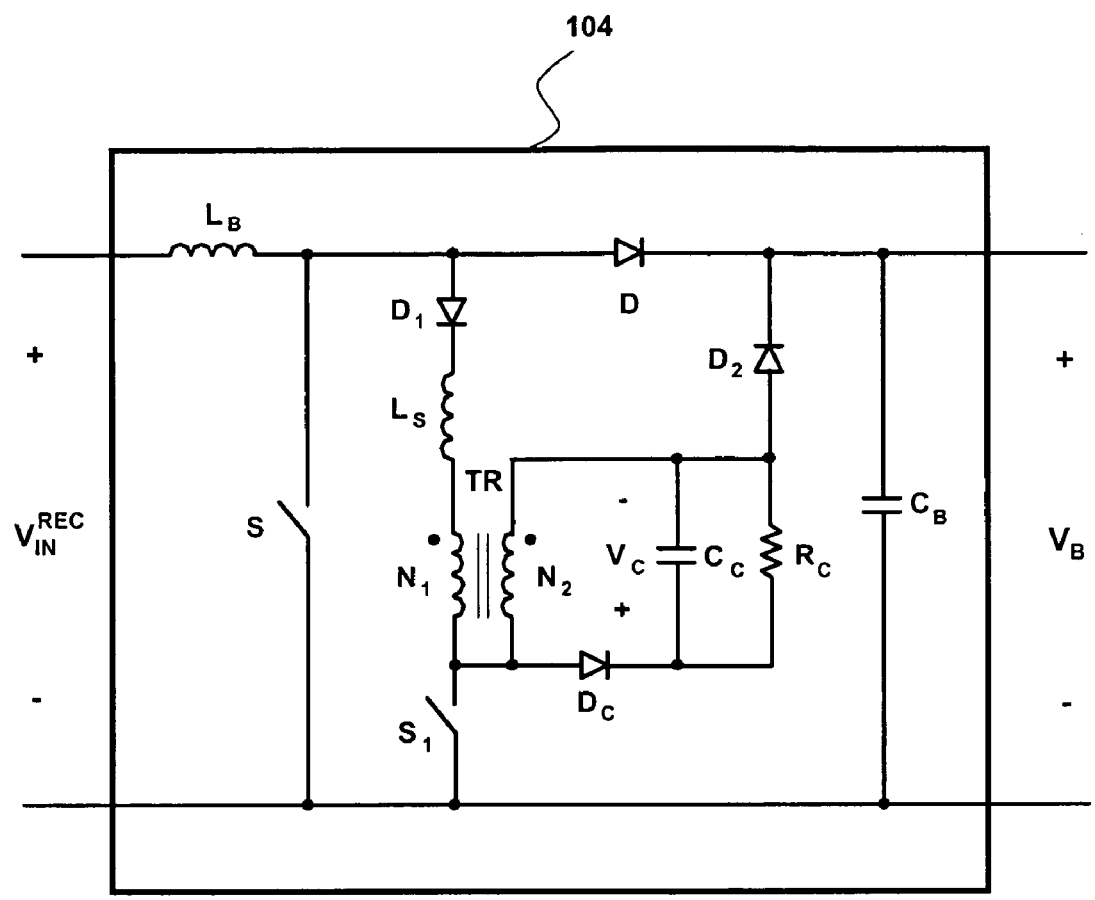
FIG. 2 shows a soft-switched boost converter that features ZVS of boost switch S and ZCS of auxiliary switch $S_1$.
Figure 3:
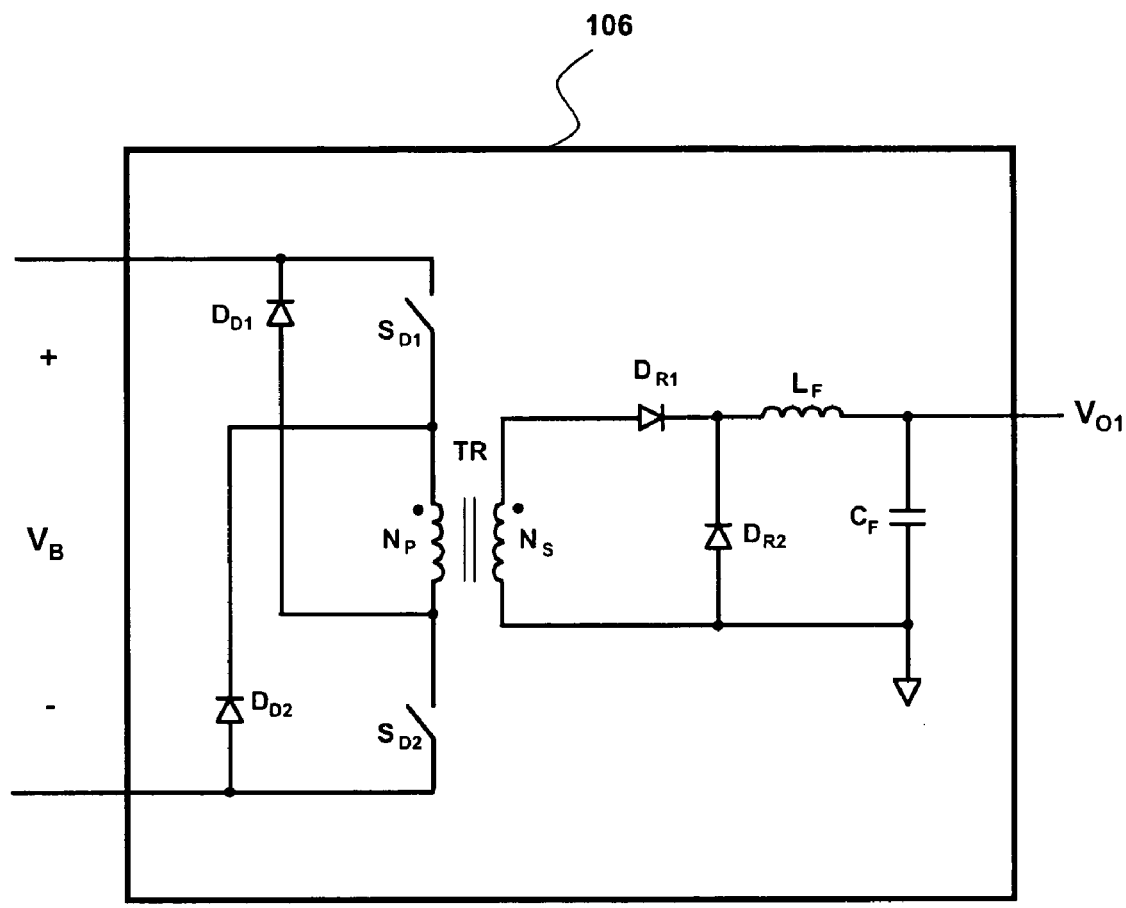
FIG. 3 shows a two-switch forward converter.
Figure 4:
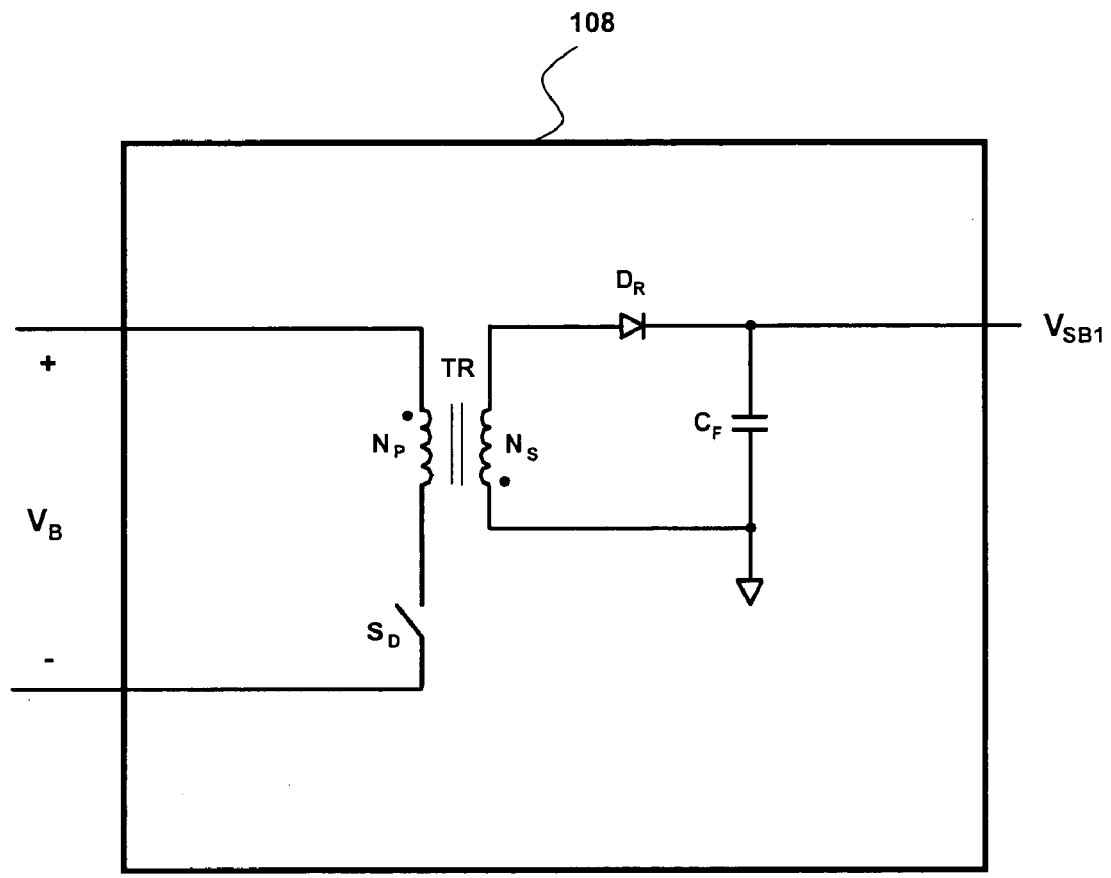
FIG. 4 shows a flyback converter that is typically used in stand-by power supplies.
Figure 5:
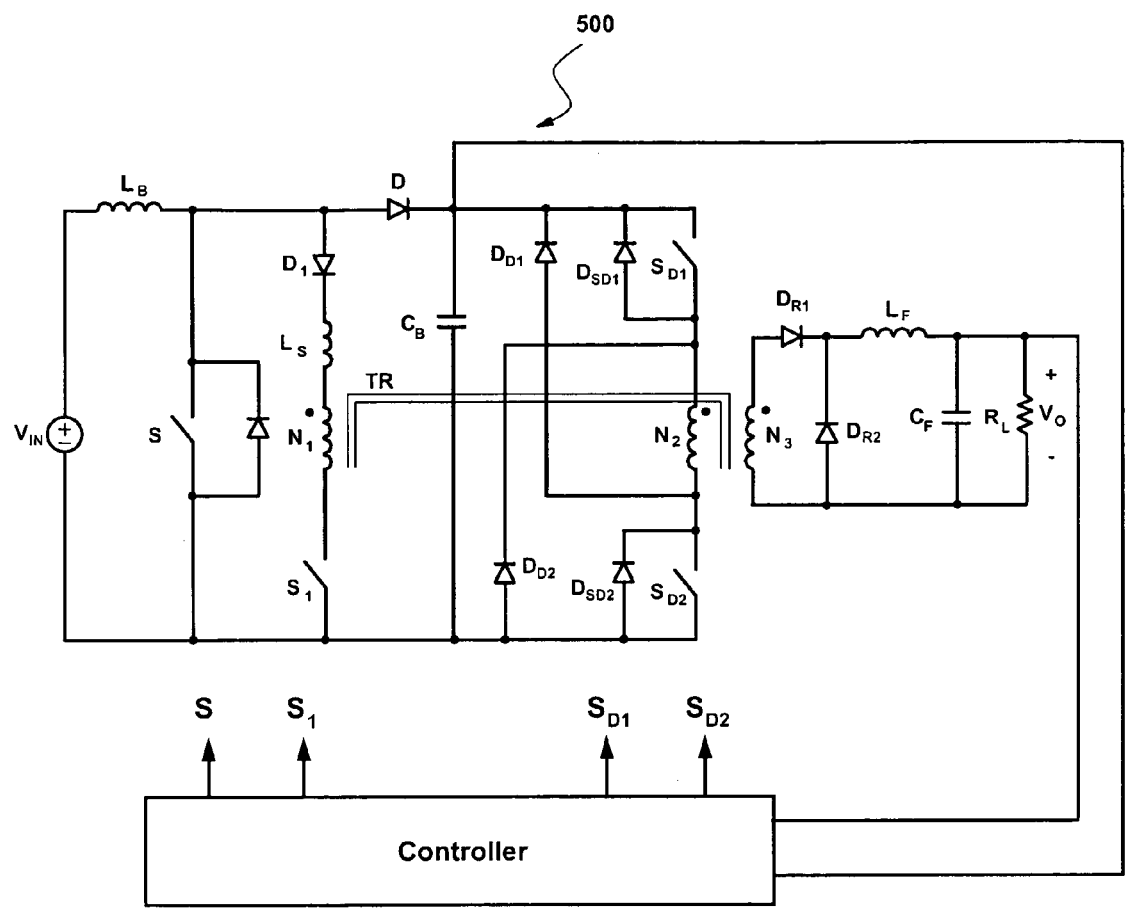
FIG. 5 shows one of the embodiments of the present invention that integrates the soft-switched boost converter shown in FIG. 2 with the two-switch forward converter shown in FIG. 3 according to one aspect of the present invention.

FIG. 5 shows an exemplary power system 500 according to one embodiment of the present invention. As shown, the power system 500 is attached to a voltage source $V_{IN}$ for deriving a load $R_L$ through multiple power conversion stages. According to this exemplary embodiment, the power system 500 includes a boost converter stage and a DC-DC output stage. A common transformer TR comprises a common magnetic device used for soft-switching of switches included in multiple power conversion stages. Although this exemplary embodiment is described in terms of a boost converter stage and a DC-DC output stage, the present invention can include any type of switching power converters.

The invention implements switching control by one or more controllers that are synchronized to turn the switches off and on. For example, one controller can regulate the output voltage of the front-end boost stage, i.e., voltage $V_B$ across the energy-storage capacitor $C_B$, while another controller regulates the output voltage $V_O$. Any control strategy can be used to control these two voltages, including multi-loop control strategies such as various current-mode control implementations.

As shown in FIG. 5, the power system 500 comprises a soft-switched front-end boost converter with an active snubber circuit that is integrated with a two-switch forward DC-DC output stage through a common transformer TR. The boost converter stage includes a boost inductor $L_B$, a boost switch S, a boost rectifier D, and an energy-storage capacitor $C_B$. The boost converter stage also includes a resonant snubber for soft switching. In FIG. 5, the snubber is formed by an auxiliary switch $S_1$, the transformer TR, an inductor $L_S$, and a blocking diode $D_1$. The power system 500 also comprises two-switch forward converter and a secondary side DC-DC output stage. The two-switch forward converter comprises switches $S_{D1}$ and $S_{D2}$ with associated antiparallel diodes $D_{SD1}$ and $D_{SD2}$, clamping diodes $D_{D1}$ and $D_{D2}$, transformer TR. The secondary side DC-DC output comprises rectifiers $D_{R1}$ and $D_{R2}$, and low-pass filter $L_F$-$C_F$, which are attached to the load $R_L$.

Figure 6:
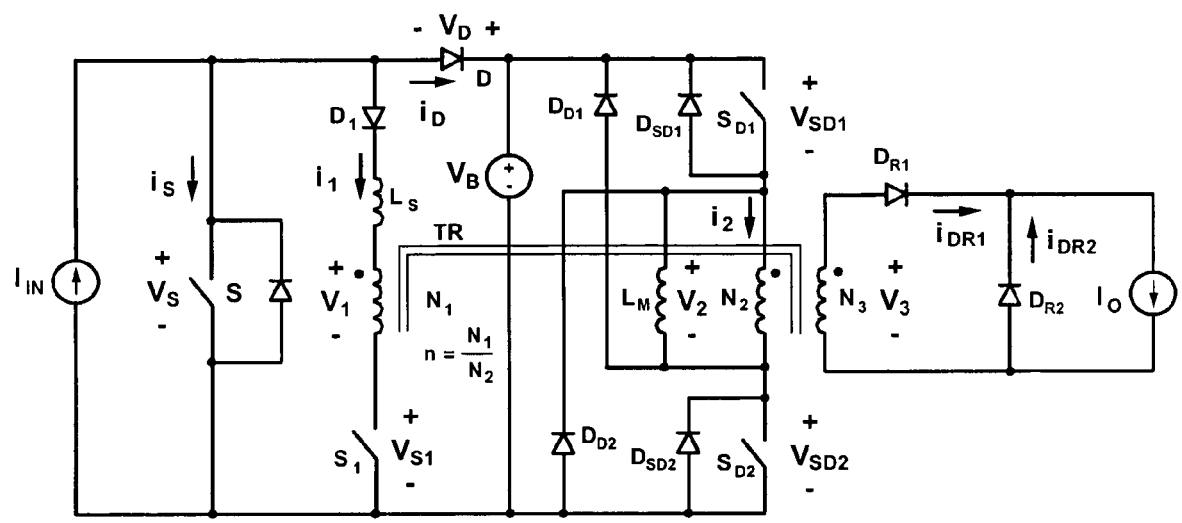
FIG. 6 shows simplified circuit diagram of the embodiment of the present invention shown in FIG. 5 along with reference directions of key currents and voltages.

To facilitate the explanation of the circuit operation, FIG. 6 shows a simplified circuit diagram of the power system of FIG. 5. In the simplified circuit, energy-storage capacitor $C_B$ is modeled by voltage sources $V_O$ by assuming that the value of $C_B$ is large enough so that the voltage ripple across the capacitor is small compared to its dc voltage. In addition, boost inductor $L_B$ is modeled as constant current source $I_{IN}$ by assuming that $L_B$ inductance is large so that during a switching cycle the current through it does not change significantly. In this analysis the leakage inductance of the transformer is neglected since it does not have a significant effect on the operation of the circuit. Moreover, the effect of the leakage inductance on the operation of the circuit can be accounted for with inductor $L_S$ since $L_S$ is connected in series with leakage inductance of winding $N_1$. As a result, transformer TR is modeled by magnetizing inductance $L_M$ and three-winding ideal transformer. Finally, it is assumed that in the on state, semiconductors exhibit zero resistance, i.e., they are short circuits. However, the output capacitance of the switches, as well as the junction capacitance and the reverse-recovery charge of the boost rectifier are not neglected in this analysis.

Figure 7A:
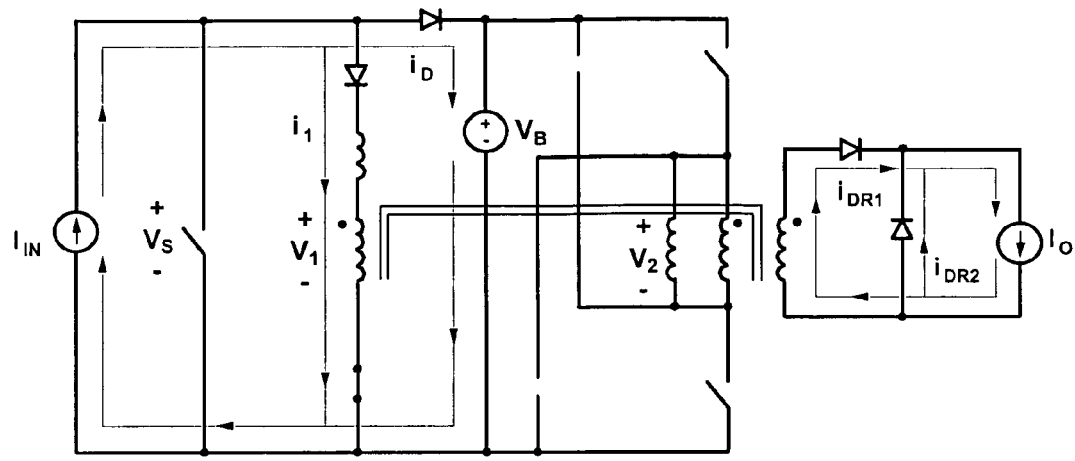
FIG. 7(a)–(j) shows major topological stages during a switching period of the circuit of the present invention shown in FIG. 5: (a) topological stage $[T_0-T_1]$; (b) topological stage $[T_1-T_2]$; (c) topological stage $[T_2-T_3]$; (d) topological stage $[T_3-T_4]$; (e) topological stage $[T_4-T_5]$; (f) topological stage $[T_5-T_6]$; (g) topological stage $[T_6-T_7]$; (h) topological stage $[T_7-T_8]$; (i) topological stage $[T_8-T_9]$; (j) stage $[T_9-T_{10}]$.
Figure 7B:
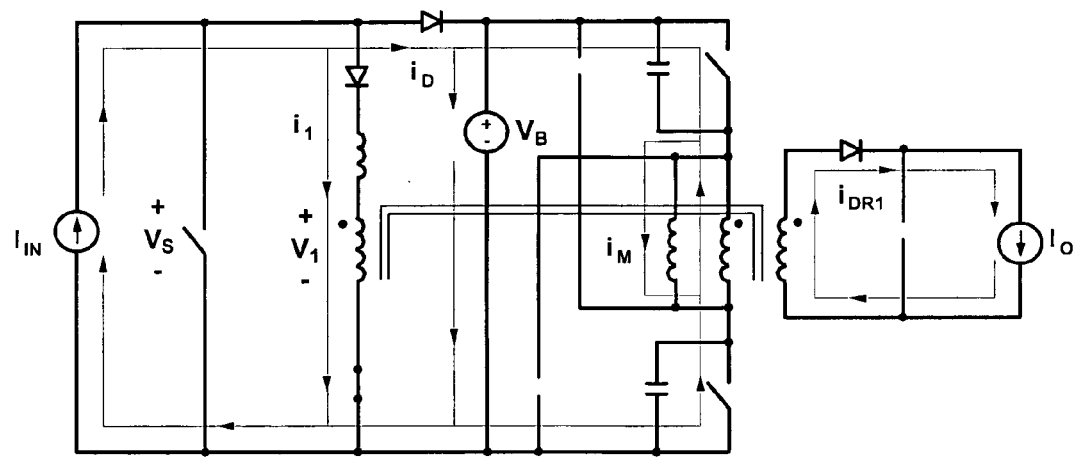
Figure 7C:
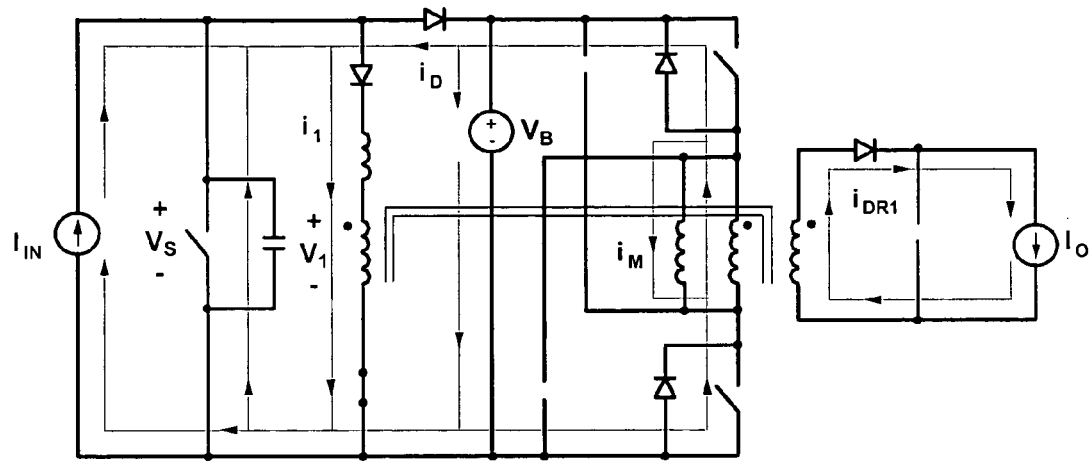
Figure 7D:
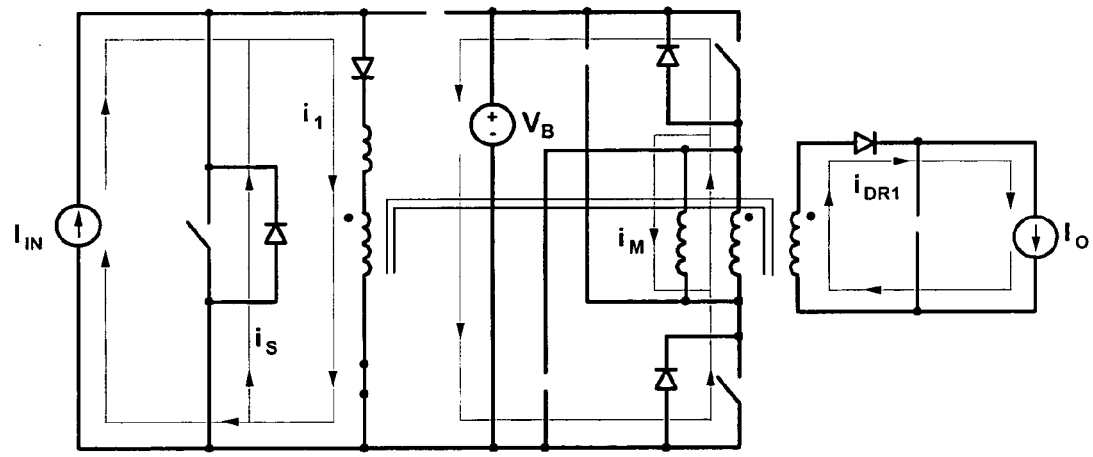
Figure 7E:
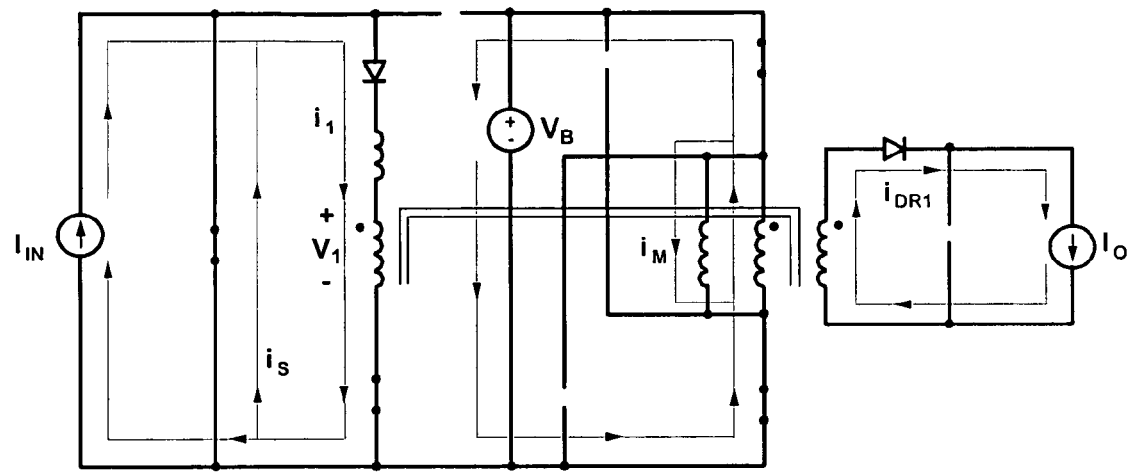
Figure 7F:
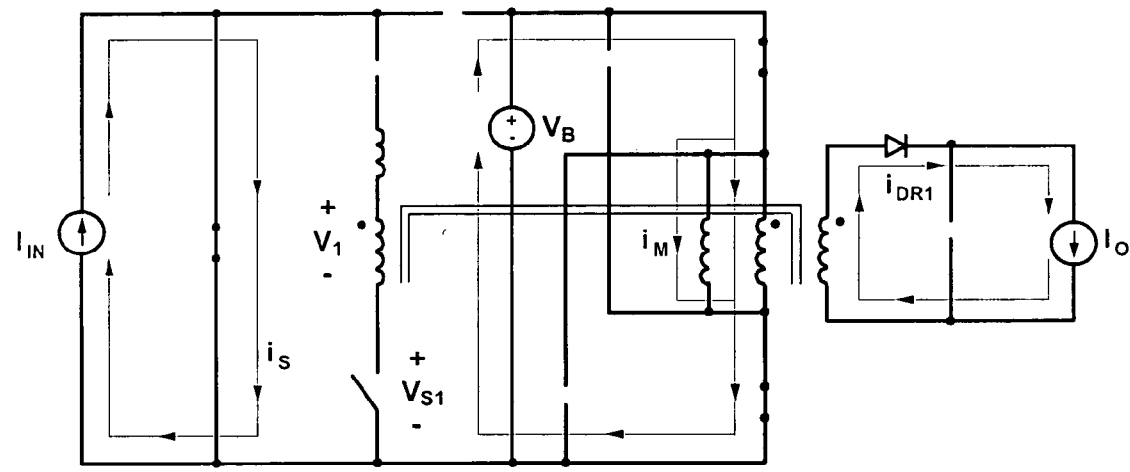
Figure 7G:
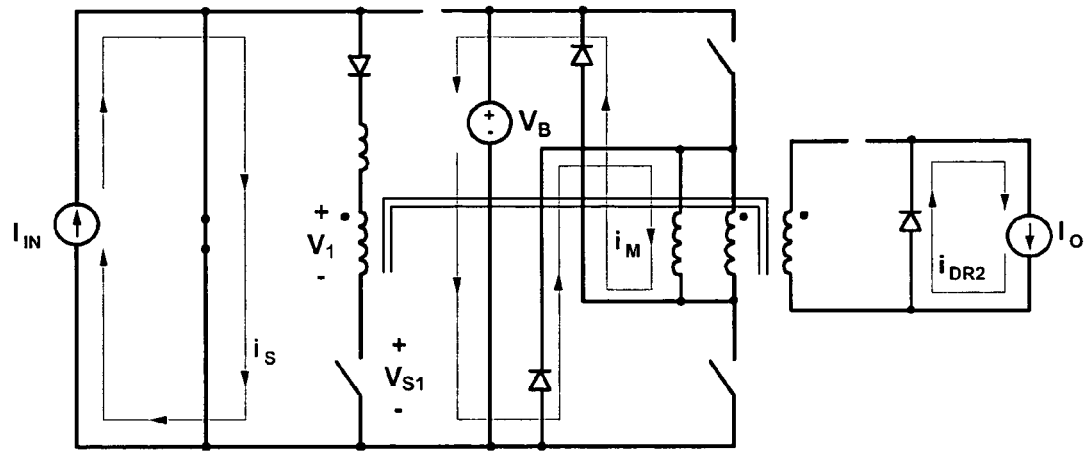
Figure 7H:
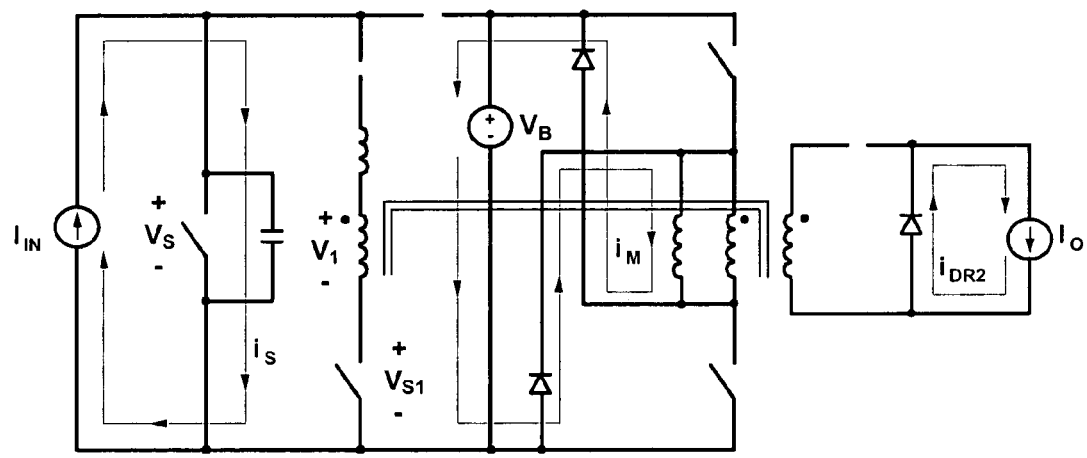
Figure 7I:
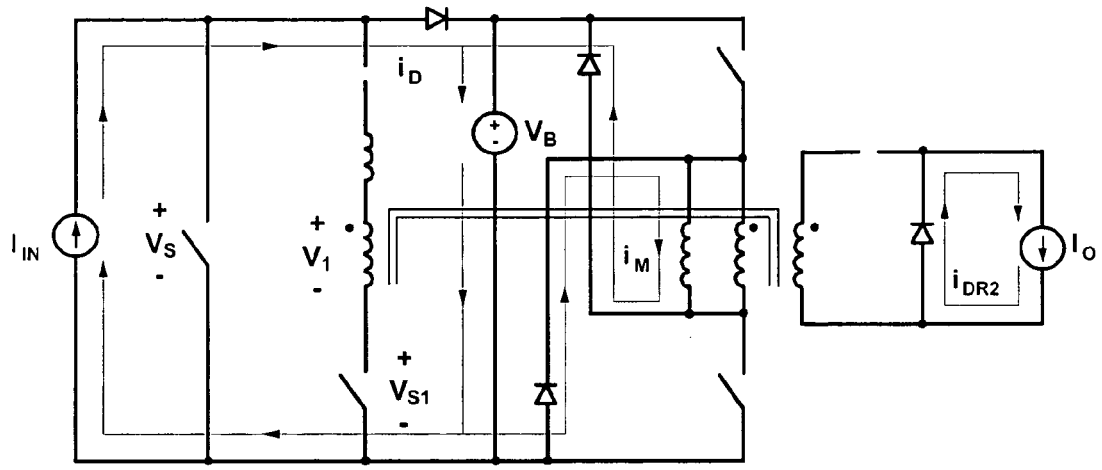
Figure 7J:
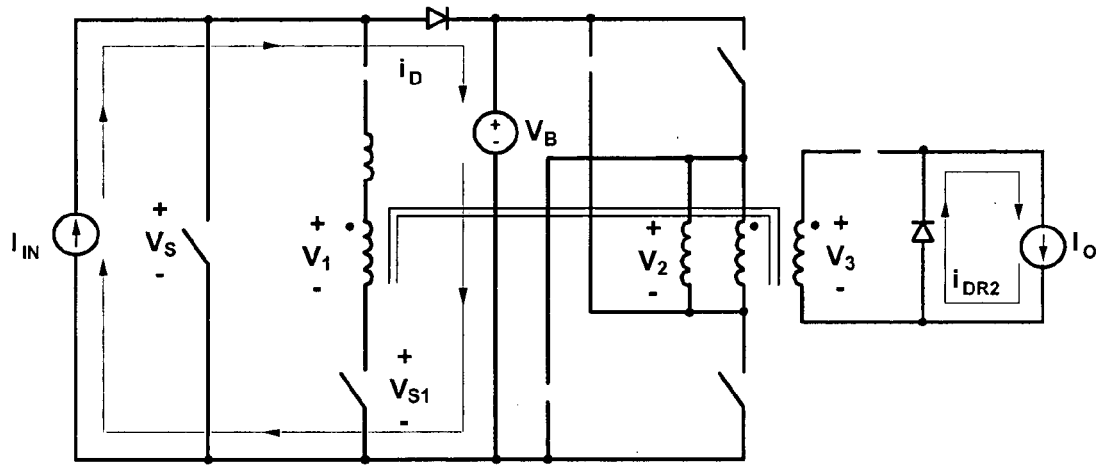
Figure 8:
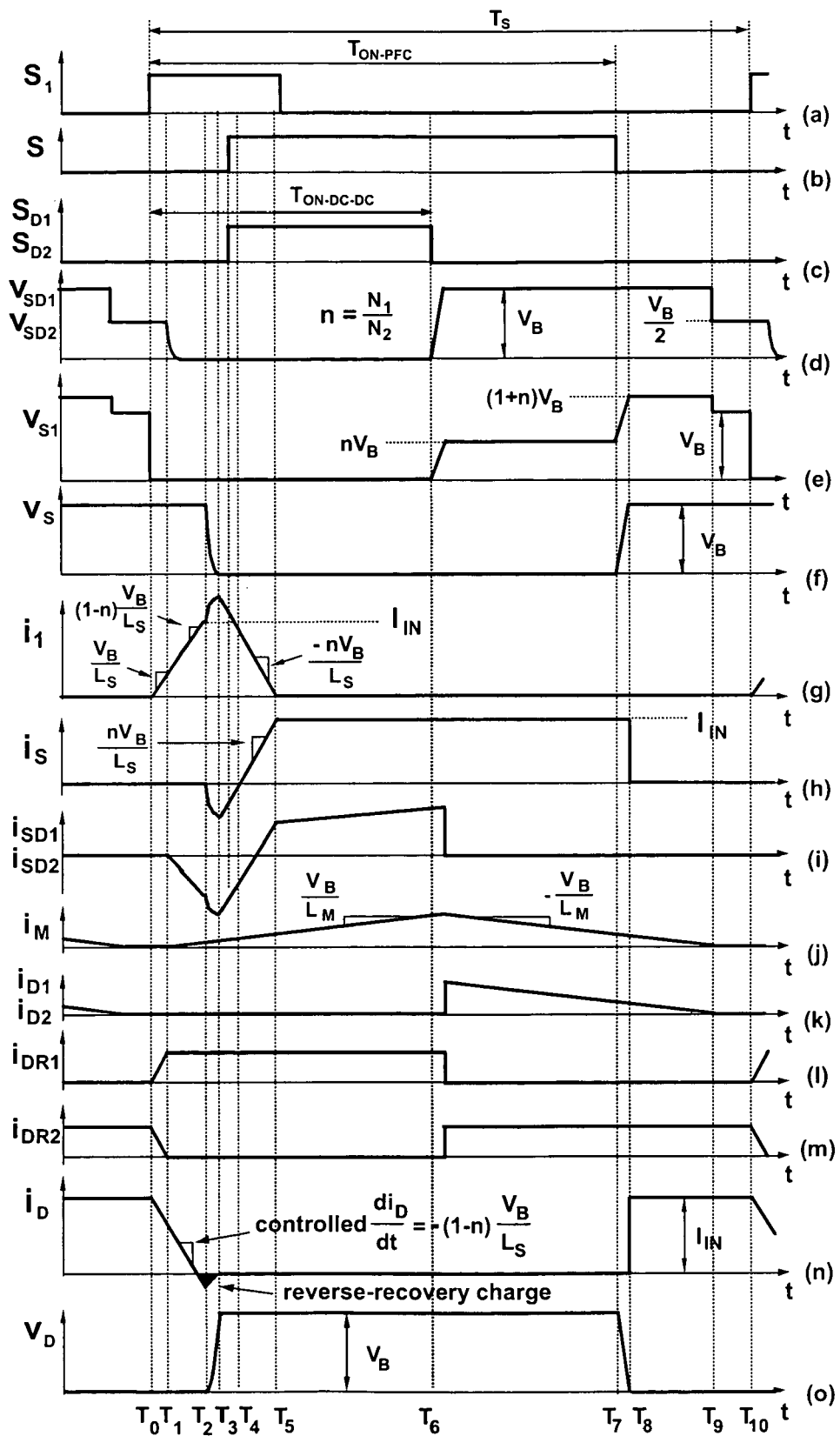
FIG. 8(a)–(n) shows key waveforms of the integrated soft-switched boost converter and two-switch forward converter in FIG. 5: (a) control signal for switch $S_1$; (b) control signal for switch S; (c) control signal for switches $S_{D1}$ and $S_{D2}$; (d) voltages $V_{SD1}$ and $V_{SD2}$ across switches $S_{D1}$ and $S_{D2}$; (e) voltage $V_{S1}$ across snubber switch $S_1$; (f) boost switch voltage $V_S$; (g) current $i_1$ through snubber inductor $L_S$; (h) boost switch current $i_S$; (i) currents $i_{SD1}$ and $i_{SD2}$ through switches $S_{D1}$ and $S_{D2}$; (j) currents $i_{D1}$ and through diodes $D_1$ and $D_2$; (k) current $i_{DR1}$ through rectifier $D_{R1}$; (l) current $i_{DR2}$ through rectifier $D_{R2}$; (m) boost rectifier current $I_D$; and (n) boost rectifier voltage $v_D$.

To further facilitate the analysis of operation, FIG. 7 shows the major topological stages of the circuit in FIG. 5 during a switching cycle, whereas FIG. 8 shows its key waveforms. The reference directions of currents and voltages plotted in FIG. 8 are shown in FIG. 7.

As can be seen from the timing diagrams in FIGS. 8(a), (b) and (c), the turn on of the boost switch S and forward-converter switches $S_{D1}$ and $S_{D2}$ are synchronized, whereas active-snubber switch $S_1$ is turned on prior to the turn on of switches S, $S_{D1}$, and $S_{D2}$. In addition, switch $S_1$ is turned off before boost switch S is turned off, i.e., the circuit of this invention operates with overlapping drive signals for the boost converter switches.

Since prior to the turn on of switch $S_1$ at $t=T_0$ all switches are open, the entire input current $i_{IN}$ flows through boost rectifier D into energy-storage capacitor $C_B$, while load current $I_O$ freewheels through rectifier $D_{R2}$. After switch $S_1$ is turned on at $t=T_0$, current $i_1$ starts flowing through winding $N_1$ of transformer TR inducing the flow of current $i_{DR1}=(N_1/N_3)i_1$ in winding $N_3$, as shown in FIG. 7(a). Because during this stage both output rectifiers $D_{R1}$ and $D_{R2}$ are conducting, the windings of the transformer are shorted, i.e., $v_1=v_2=v_3=0$. As a result, the entire voltage of the energy-storage-capacitor $V_B$ is impressed across snubber inductor $L_S$ so that currents $i_1$ and $i_{DR1}$ continue to increase linearly, as illustrated in FIGS. 8(g) and (k). As current $i_{DR1}$ increases, current $i_{DR2}$ decreases at the same rate until at $t=T_1$ it becomes zero, i.e., freewheeling rectifier $D_{R2}$ turns off. Since after the turn-off of $D_{R2}$ current through winding $N_3$ is constant, i.e., $i_{DR1}=I_O$, the further increase of current $i_1$ will induce current $i_2$ in winding $N_2$, as shown in FIG. 7(b). This current will start discharging output capacitances of switches $S_{D1}$ and $S_{D2}$. At the same time, the voltage of $v_2$ across winding $N_2$ of the transformer will start increasing which will cause magnetizing current to start flowing, as illustrated in FIG. 7(b). After the output capacitances of switches $S_{D1}$ and $S_{D2}$ are fully discharged at $t=T_2$, current $i_2$ continues to flow through the antiparallel diodes of switches $S_{D1}$ and $S_{D2}$, as shown in FIG. 7(c). To achieve zero-voltage-switching (ZVS) of $S_{D1}$ and $S_{D2}$, switches $S_{D1}$ and $S_{D2}$ should be turned on while their antiparallel diodes are conducting. To simplify the control circuit timing diagram, in the circuit of this invention the turn-on of switches $S_{D1}$ and $S_{D2}$ is synchronized with the turn-on of boost switch S.

When antiparallel diodes of switches $S_{D1}$ and $S_{D2}$ are conducting, voltage across winding $N_2$ is $v_2=V_B$ so that induced voltage $v_1$ on winding $N_1$ is $$v_1 = \frac{N_1}{N_2} V_B = nV_B, \quad (1)$$

where it is required that turns ratio $n=N_1/N_2<1$ for proper operation of the circuit.

Since $v_1$ is constant, voltage applied across snubber inductor $L_S$ is also constant so that current $i_1$ increases linearly with a slope of $$\frac{di_1}{dt} = \frac{V_B - v_1}{L_S} = \frac{V_B - nV_B}{L_S} = (1-n)\frac{V_B}{L_S}. \quad (2)$$

At the same time, magnetizing inductance $i_M$ increases with a slope given by $$\frac{di_M}{dt} = \frac{V_B}{L_M}. \quad (3)$$

As current $i_1$ linearly increases, boost rectifier current $i_D$ linearly decreases at the same rate since the sum of $i_1$ and $i_D$ is equal to constant input current $I_{IN}$, i.e. $i_1+i_D=I_{IN}$. Therefore, in the circuit of this invention the turn-off rate of the boost rectifier $$\frac{di_D}{dt} = -(1-n)\frac{V_B}{L_S} \quad (4)$$

can be controlled by a proper selection of the inductance value of snubber inductor $L_S$ and turns ratio n of transfer TR. Typically, for today's fast-recovery rectifiers, the turn-off rate $di_D/dt$ should be kept around 100 A/µs. With such a selected turn-off rate, the reverse-recovery current of the rectifier and the related power losses and EMI problems are minimized.

The topological stage in FIG. 7(c) ends at $t=T_3$ when boost rectifier D turns off and current $i_1$ starts discharging output capacitance of boost switch, as shown in FIG. 7(d). If the turns ratio of transformer TR is selected so that n<0.5, the energy stored in $L_S$ is sufficient to completely discharge output capacitance of boost switch S regardless of the load and line conditions. Once the capacitance is fully discharge at $t=T_4$, current $i_1$ continues to flow through the antiparallel diode of boost switch S, as shown in FIG. 7(e). Because during this topological stage voltage $v_1$ is impressed in the negative direction across snubber inductor $L_S$, current $i_1$ starts linearly decreasing at the rate given by $$\frac{di_1}{dt} = -\frac{nV_B}{L_S}, \quad (5)$$

as illustrated in FIG. 8(g). As a result, auxiliary-switch current $i_{S1}=i_1$ also starts linearly decreasing, whereas boot-switch current $i_S$ starts linearly increasing from a negative peak, as shown in FIGS. 8(g) and (h). To achieve ZVS of boost switch S, it is necessary to turn on boost switch S before its current becomes positive at $t=T_4$, i.e., until $i_S$ still flows through the antiparallel diode of switch S, as it is illustrated in FIG. 8(h).

As shown in FIG. 8(g), current $i_1$ continues to discharge until it reaches zero at $t=T_5$, when snubber switch $S_1$ is turned off to achieve zero-current switching of $S_1$. With switch $S_1$ turned off, the entire input current $I_{IN}$ flows through boost switch S and the front-end boost stage is completely decoupled from the dc/dc two-switch forward converter output stage, as shown in FIG. 7(f). As a result, for the rest of the switching cycle, the two-switch forward converter output stage continues to operate as the conventional two-switch forward converter.

At $t=T_6$ forward converter switches $S_{D1}$ and $S_{D2}$ are turned off, which forces commutation of the load current from rectifier $D_{R1}$ to $D_{R2}$ as shown in FIG. 7(g). At the same time, transformer magnetizing current $i_M$ starts flowing through diodes $D_{D1}$ and $D_{D2}$ initiating the reset of the transformer by impressing voltage $V_B$ across the primary of the transformer in the negative direction. During the reset time of the transformer, voltages $v_{SD1}$ and $v_{SD2}$ across the forward-converter switches are equal to $V_B$, whereas the voltage across auxiliary switch is $nV_B$ due to the magnetic coupling of windings $N_1$ and $N_2$, as illustrated in FIGS. 8(d) and (e).

When at $t=T_7$ boost switch is turned off, voltage across switch S starts linearly increasing because constant input current $I_{IN}$ starts charging output capacitance of the switch, as shown in FIG. 7(h). The increasing boost-switch voltage causes an equal increase of voltage $v_{S1}$ across snubber switch $S_1$. When at $t=T_8$, boost-switch voltage $v_S$ reaches $V_B$, boost diode starts conducting, as shown in FIG. 7(i). At the same time, voltage $v_{S1}$ reaches its maximum value of $(1+n)V_B$.

Finally, at $t=T_9$, magnetizing current $i_M$ that flows through diodes $D_{D1}$ and $D_{D2}$ reaches zero completing the reset of the transformer, as shown in FIG. 7(j). With the transformer reset, switch voltages $V_{DS1}$ and $V_{DS2}$ decrease from $V_B$ to $0.5V_B$, causing the corresponding decrease of voltage $v_{S1}$ of snubber switch from $(1+n)V_B$ to $V_B$, as illustrated in FIGS. 8(d) and (e). The circuit stays in the topological stage in FIG. 7(j) until the next switching cycle is initiated at $t=T_{10}$.

In summary, one feature of the invention involves soft-switching of semiconductor devices using a common magnetic device that creates the conditions for soft-switching. Specifically, boost switch S and forward-converter switches $S_{D1}$ and $S_{D2}$ are turned on with ZVS, whereas snubber switch $S_1$ is turned off with ZCS. In addition, boost diode D is turned off with controlled turn-off rate of its current. Because of soft switching of all semiconductor components, the overall switching losses are minimized, which maximizes the conversion efficiency. In addition, soft switching has beneficial effect on EMI that may result in a smaller size of the input filter.

However, preferably a complete ZVS of switches $S_{D1}$ and $S_{D2}$ can only be achieved if input current $I_{IN}$, which is being commutated to winding $N_1$ when snubber switch $S_1$ is closed, is large enough to produce a negative current through primary winding $N_2$ and discharge the output capacitances of switches $S_{D1}$ and $S_{D2}$, as shown in FIG. 7(b). According to FIG. 7(b), to have a negative current flowing through winding $N_2$ at $t=T_1$, current $i_1$ reflected to winding $N_2$ has to be greater than output current $I_O$ reflected to $N_2$. If this condition is not met than switches $S_{D1}$ and $S_{D2}$ operate with partial ZVS. This mode of operation typically occurs in ac/dc applications around the zero crossings of the line voltage since input (line) current is also low around the zero crossings of the line voltage.

Due to the ZVS of the boost switch, one suitable implementation of the circuit in FIG. 5 is with the boost switch consisting of a MOSFET (Metal Oxide Semiconductor Field Effect Transistor) device, or a parallel combination of MOSFETs. Similarly, due to the ZCS of the auxiliary switch, the circuit in FIG. 5 is suitable for an IGBT (Insulated Gate Bipolar Transistor) auxiliary switch. However, the circuit can also be implemented with a MOSFET auxiliary switch without a performance penalty. An implementation with an IGBT boost switch is possible with a turn-off snubber capacitor connected across the IGBT to reduce the turn-off loss due to IGBT's current-tail effect. In this case, it is necessary to design the circuit so the boost switch turns on with ZVS so that the snubber capacitor does not contribute to the turn-on switching loss. Finally, with the implementation with the IGBT for the boost switch, an IGBT with a co-packaged antiparallel diode, or an external diode can be used.

In the circuit of this invention, the voltage and current stress on switches S, $S_{D1}$ and $S_{D2}$, and boost rectifier D are identical to the corresponding stresses in the conventional boost converter without a snubber. The voltage stress of snubber switch $S_1$ is $$v_{S1(MAX)} = (1+n)V_B, \quad (6)$$

where $n = N_1/N_2$.

Figure 9:
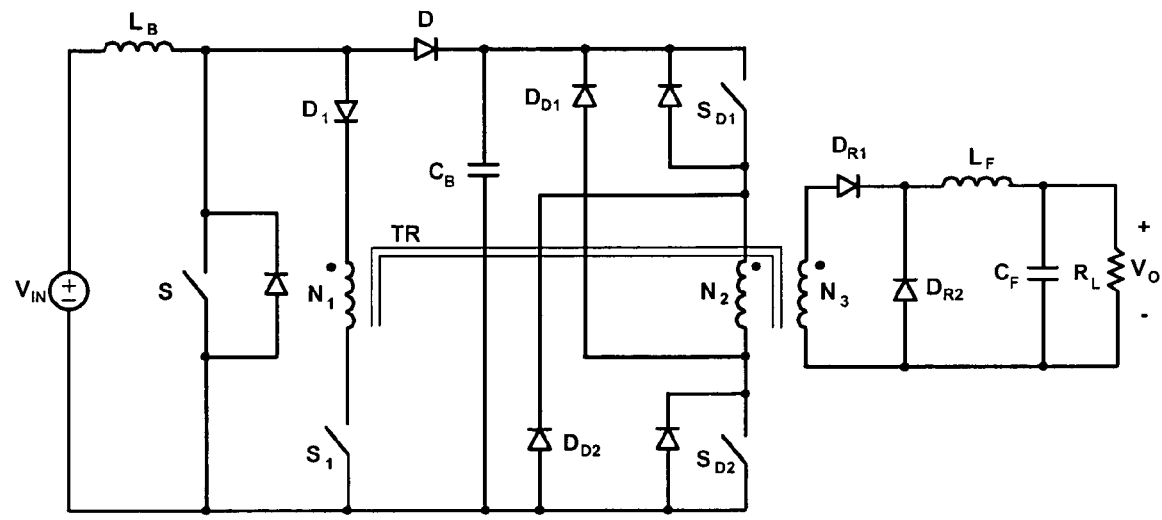
FIG. 9 shows an embodiment without external snubber inductor $L_S$.

The invention can also be implemented without external snubber inductor $L_S$, as shown in the circuit diagram in FIG. 9. In this implementation, the leakage inductance of the transformer (not shown in FIG. 9) serves as the snubber inductance. The operation of this circuit is identical to that with the external snubber inductor.

Figure 10:
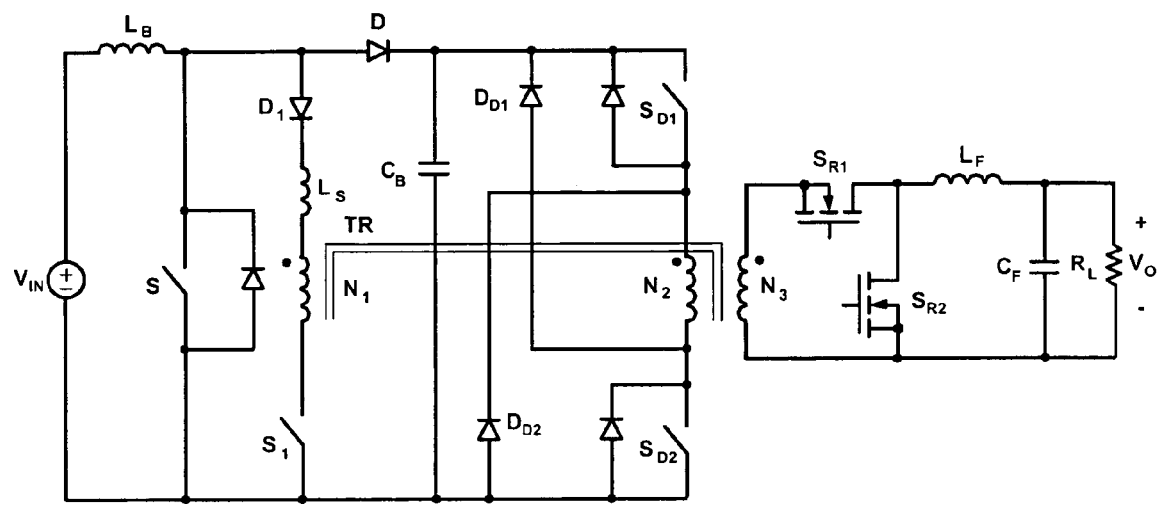
FIG. 10 shows an embodiment with secondary-side diode rectifiers replaced by synchronous rectifiers.

Another implementation of the circuit of this invention is shown in FIG. 10. In this implementation, the circuit of employs secondary-side synchronous rectifiers instead of diode rectifiers $D_{R1}$ and $D_{R2}$.

Figure 11:
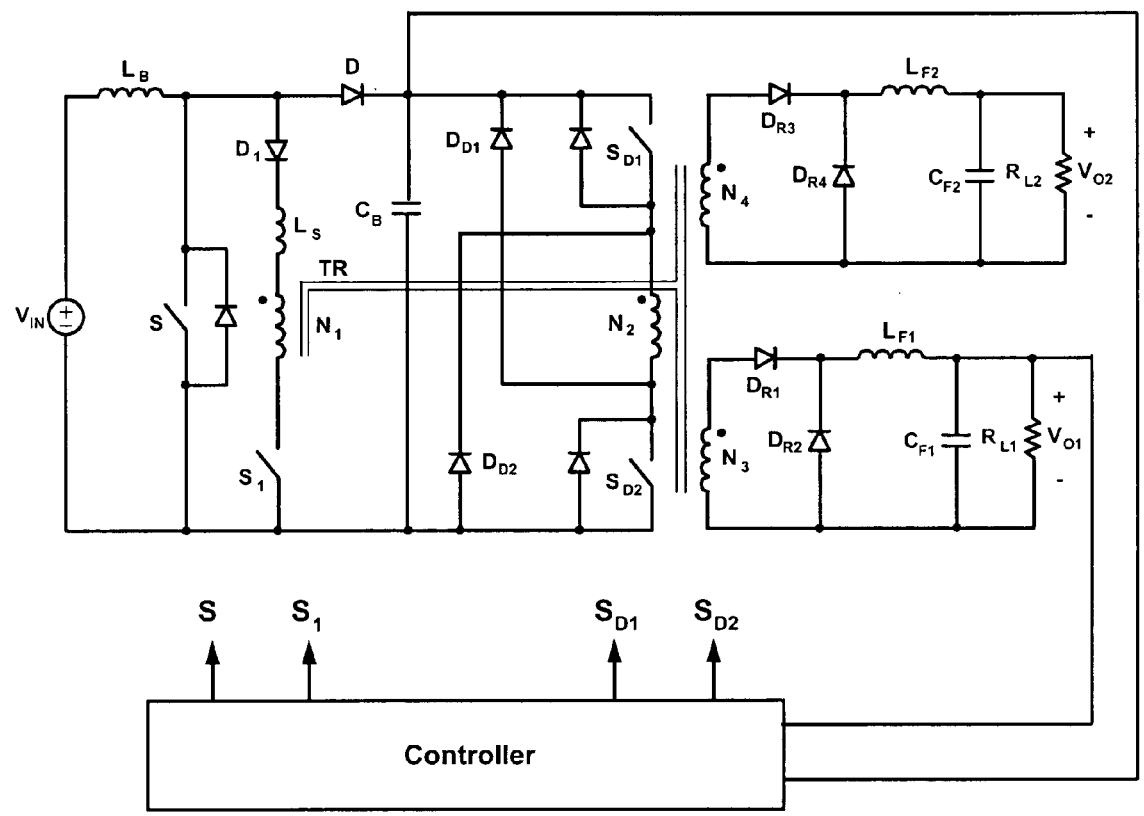
FIG. 11 shows an embodiment with two outputs, where second output is cross-regulated.
Figure 12:
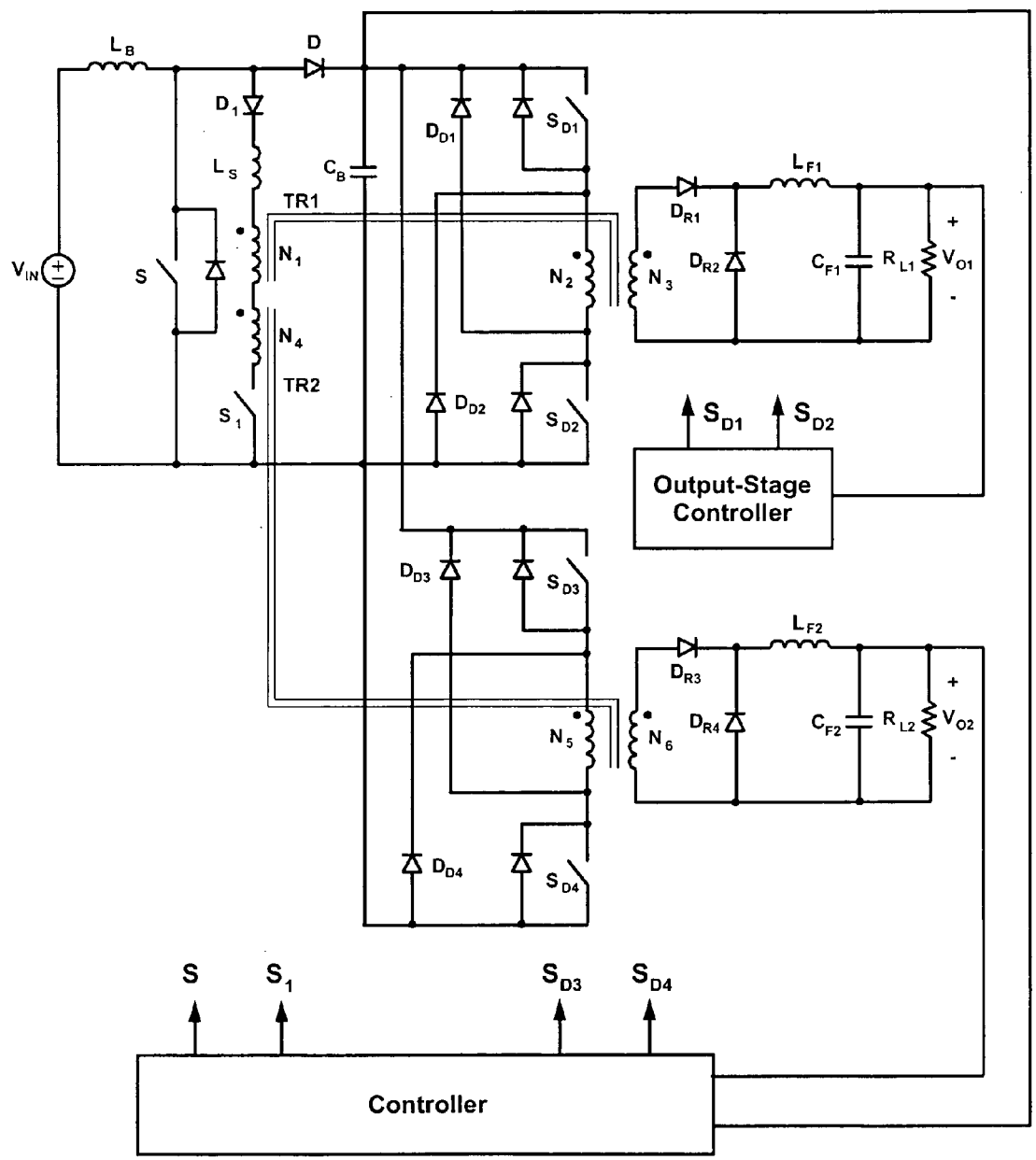
FIG. 12 shows an embodiment with two regulated outputs.

The concept of the soft-switched boost converter with integrated isolated power supply can be also extended to multiple outputs. FIG. 11 shows the implementation with two outputs where the second output is cross-regulated, whereas FIG. 12 shows the implementation with two regulated outputs. In the implementation in FIG. 12, boost switch S and forward-converter switches $S_{D1}$, $S_{D2}$, $S_{D3}$, and $S_{D4}$ have synchronized turn-on instants.

Figure 13:
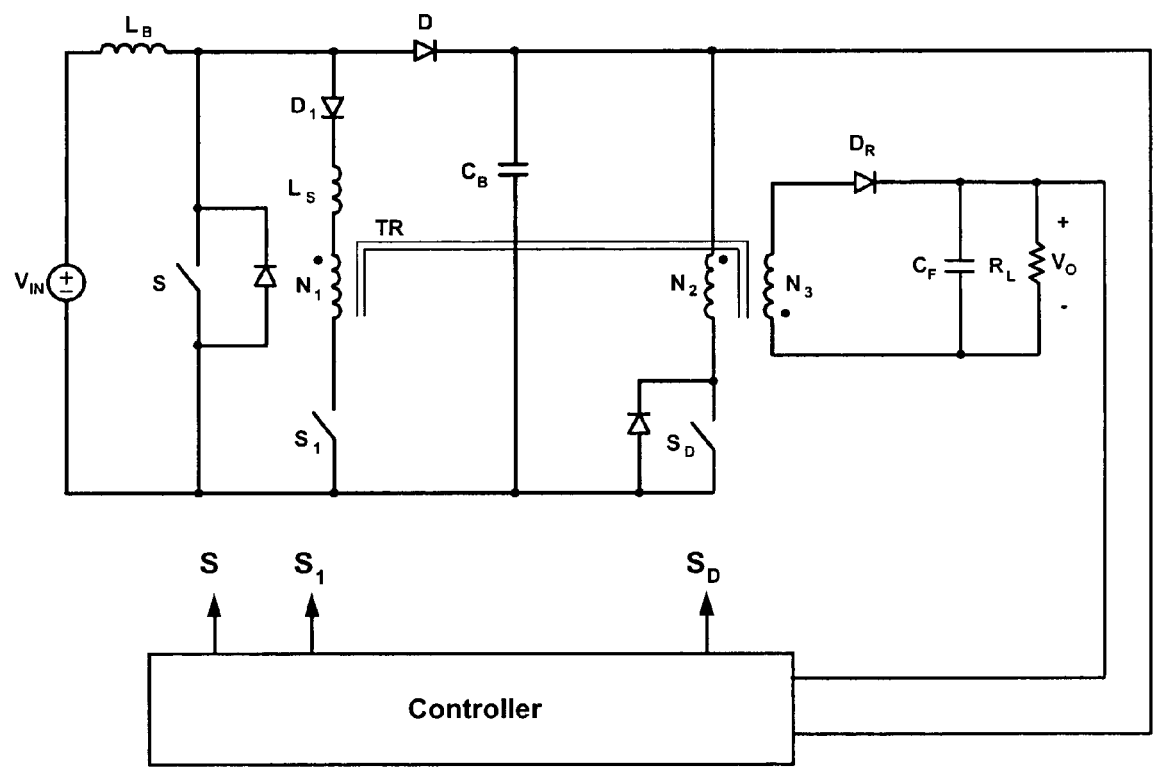
FIG. 13 shows another embodiment of the present invention that integrates the soft-switched boost converter shown in FIG. 2 with the flyback converter shown in FIG. 4.
Figure 14:
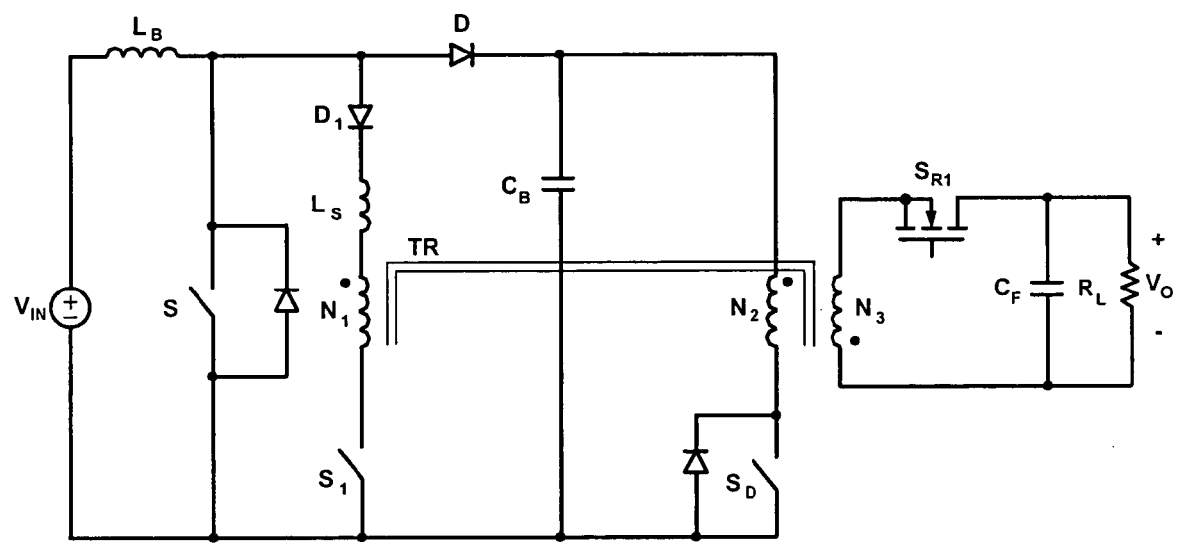
FIG. 14 shows the embodiment in FIG. 13 with a secondary-side synchronous rectifier.
Figure 15:
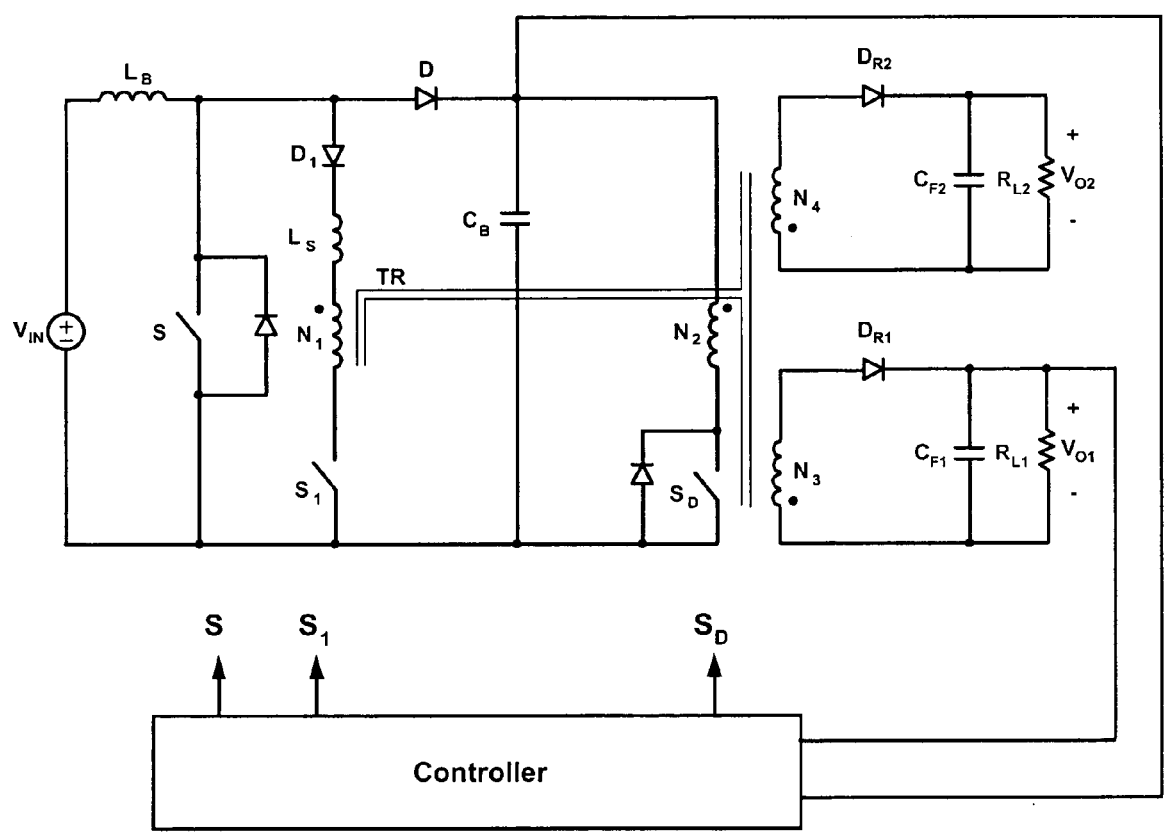
FIG. 15 shows the embodiment in FIG. 13 with two outputs.

The concept of this invention can also be extended to other output-stage topologies. FIG. 13 shows the embodiment of this invention with the flyback output stage. The operation of the circuit in FIG. 13 is similar to that of the circuit in FIG. 5. The circuit in FIG. 13 can also be implemented with synchronous rectifiers and multiple outputs, as shown in FIGS. 14 and 15, respectively.

Figure 16:
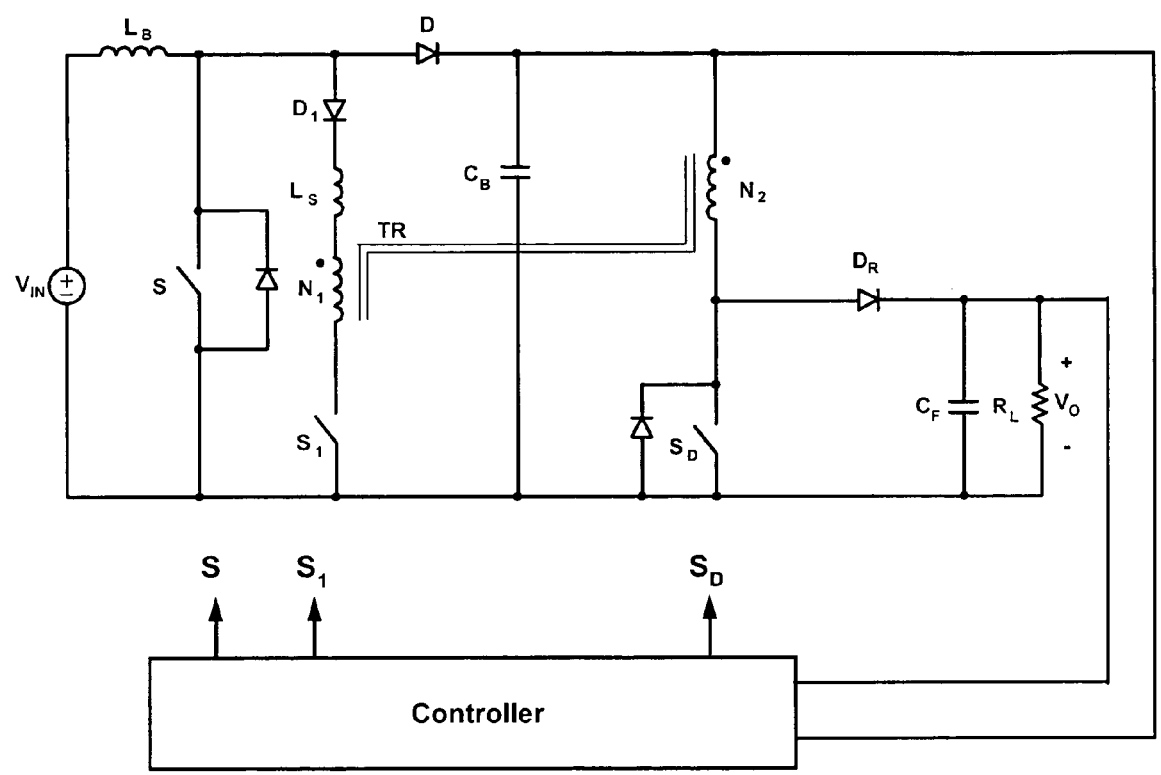
FIG. 16 shows another embodiment of the present invention that integrates the soft-switched boost converter shown in FIG. 2 with the other boost converters.
Figure 17:
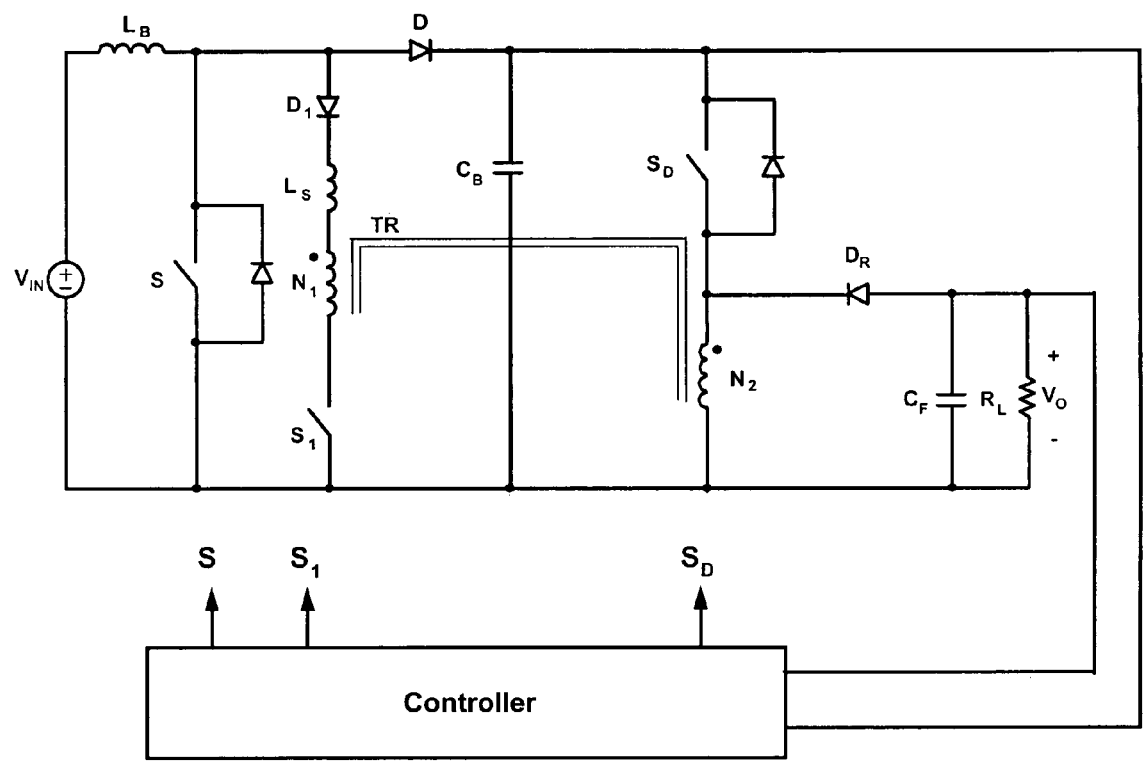
FIG. 17 shows another embodiment of the present invention that integrates the soft-switched boost converter shown in FIG. 2 with a buck-boost converter.
Figure 18:
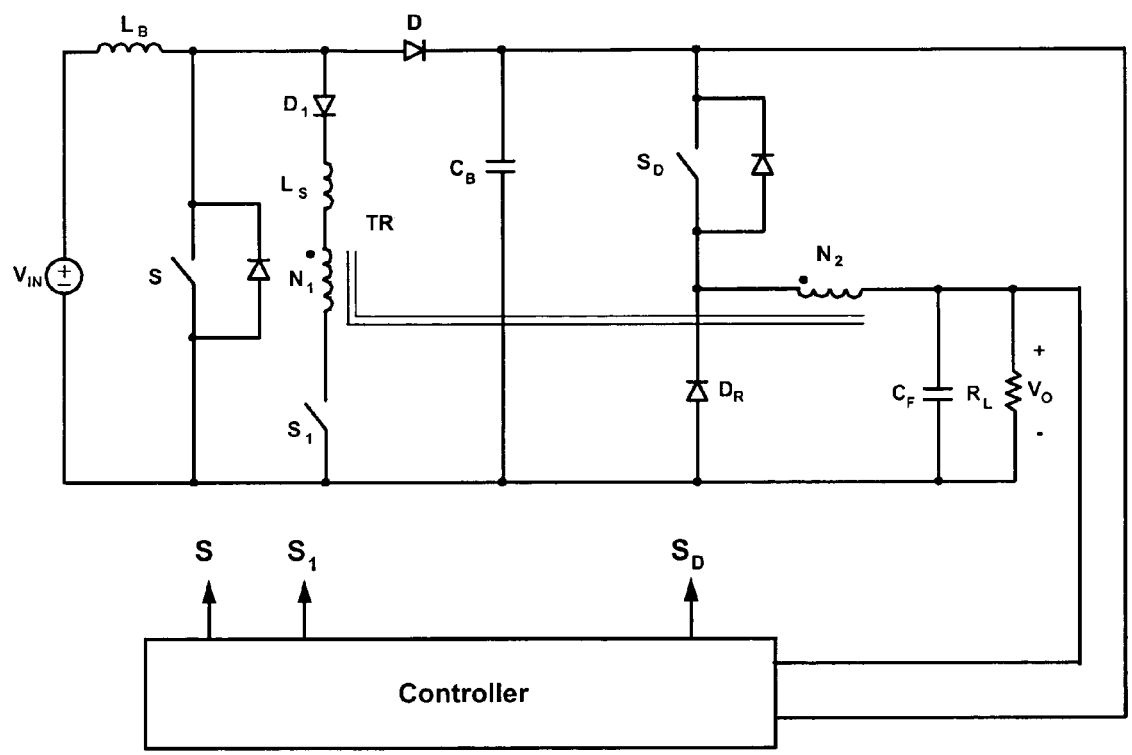
FIG. 18 shows another embodiment of the present invention that integrates the soft-switched boost converter shown in FIG. 2 with a buck converter.
Figure 19:
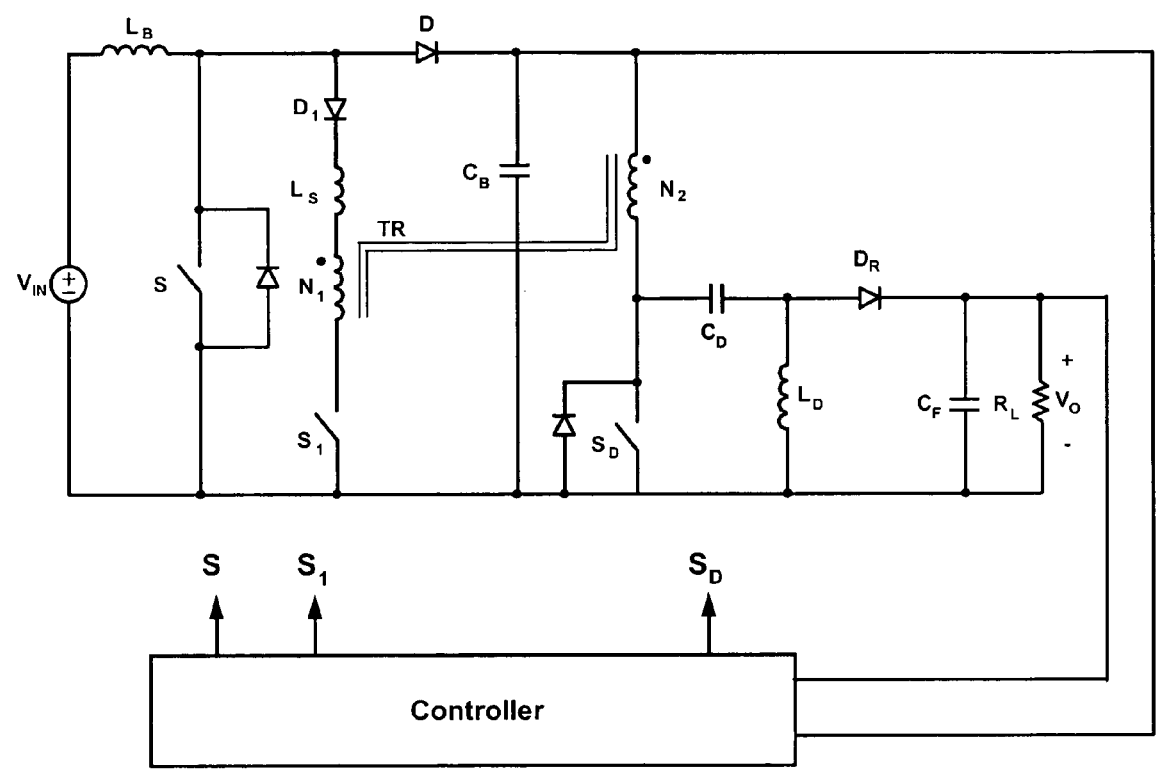
FIG. 19 shows another embodiment of the present invention that integrates the soft-switched boost converter shown in FIG. 2 with a SEPIC converter.
Figure 20:
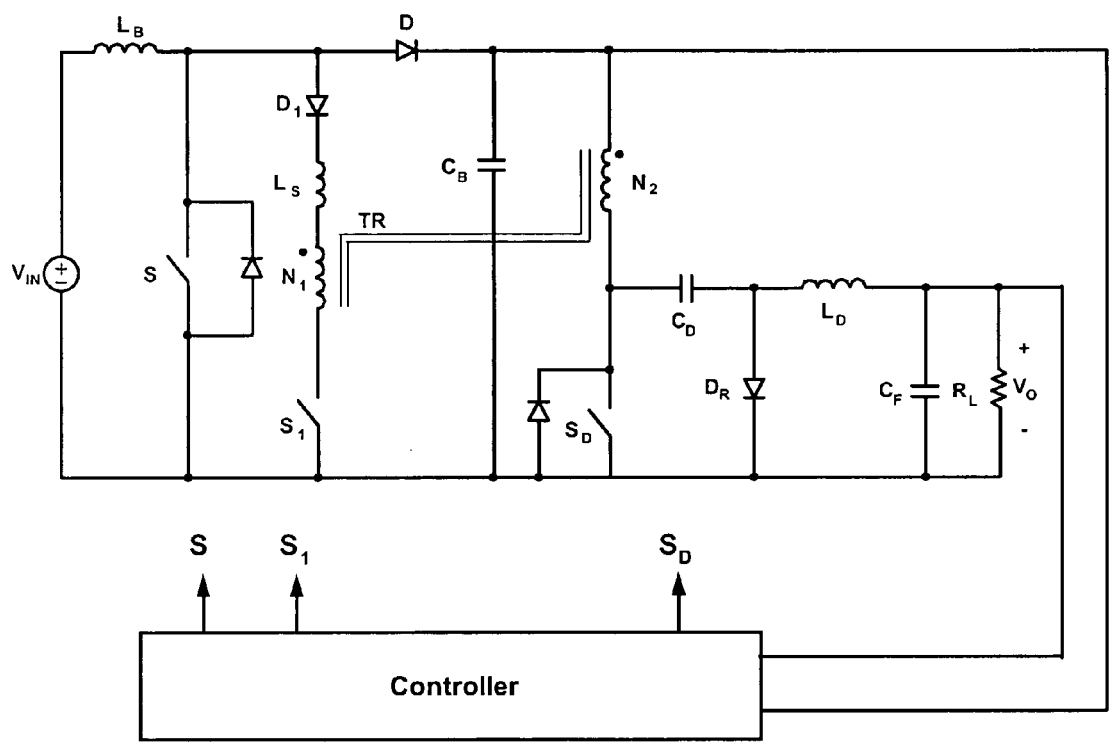
FIG. 20 shows another embodiment of the present invention that integrates the soft-switched boost converter shown in FIG. 2 with a CUK converter.
Figure 21:
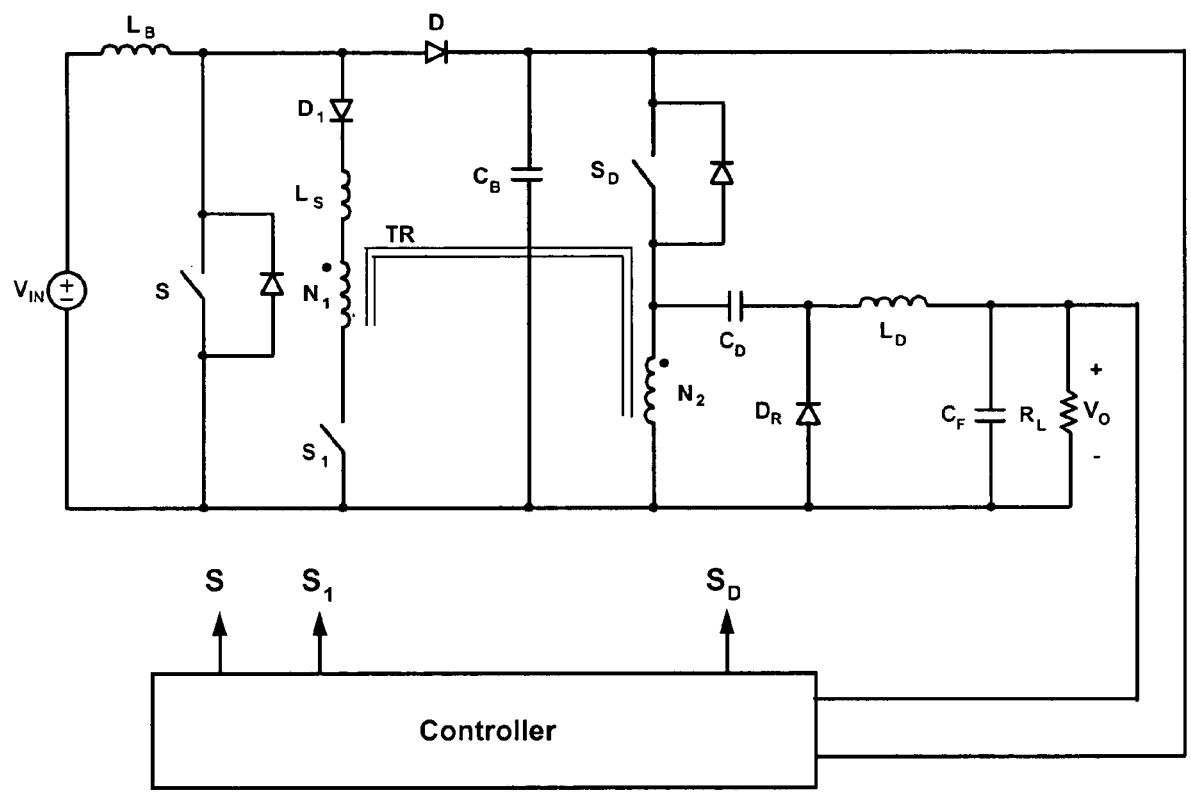
FIG. 21 shows another embodiment of the present invention that integrates the soft-switched boost converter shown in FIG. 2 with a dual of SEPIC converter.
Figure 22:
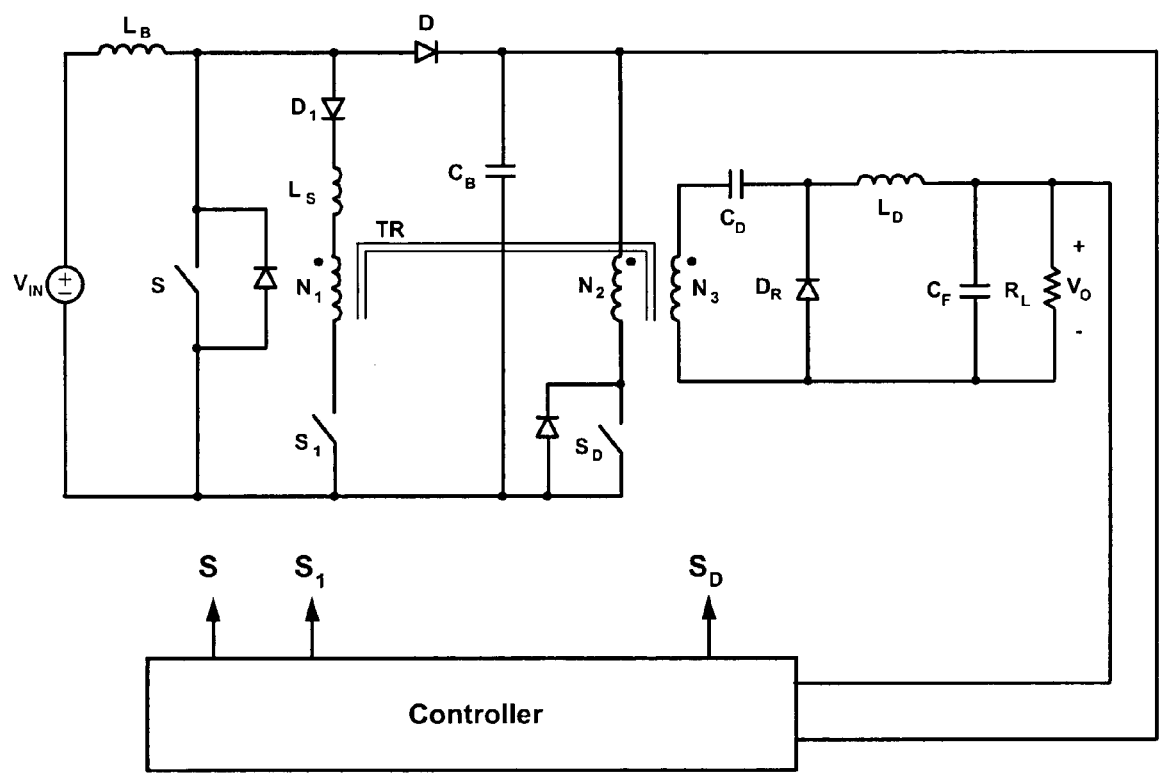
FIG. 22 shows another embodiment of the present invention that integrates the soft-switched boost converter shown in FIG. 2 with an isolated dual of SEPIC converter.

FIGS. 16, 17, and 18 show embodiments of this invention with the boost converter, buck-boost converter, and buck converter, respectively. FIGS. 19 and 20 show embodiments of this invention with the SEPIC converter and CUK converter, respectively. FIGS. 21 and 22 show embodiments of this invention with the dual of SEPIC converter and the isolated dual of SEPIC converter, respectively.

Figure 23:
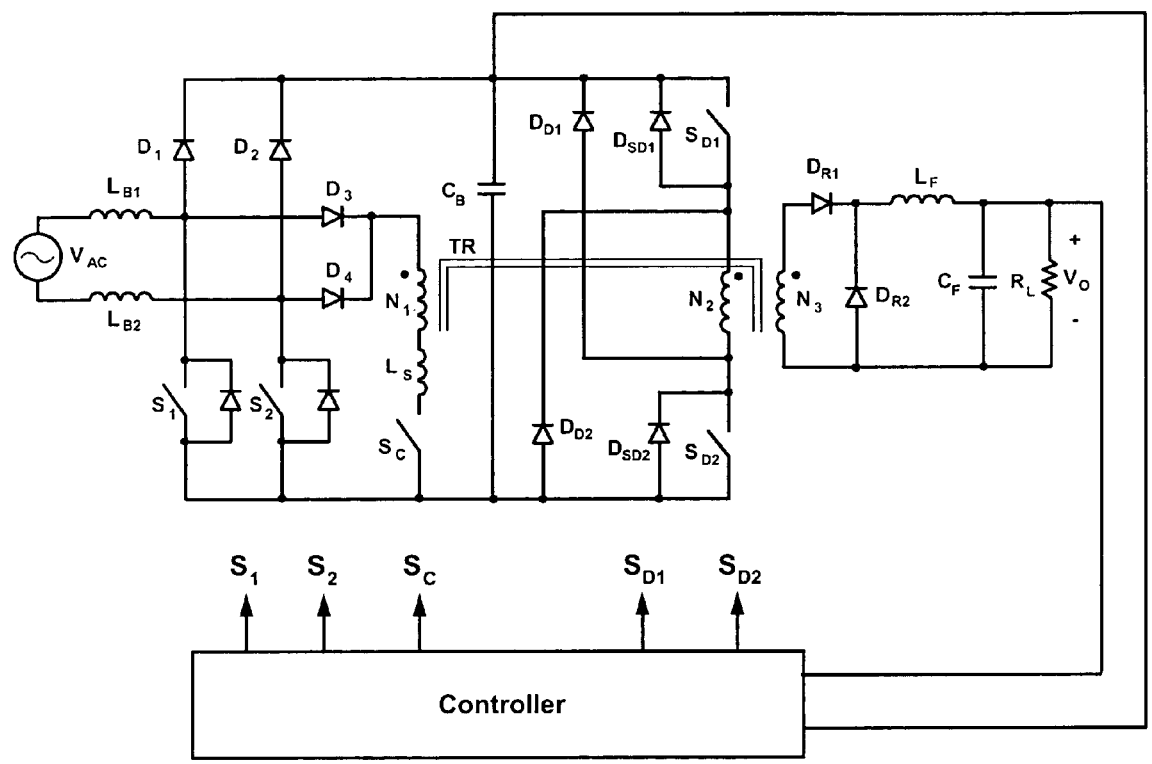
FIG. 23 shows another embodiment of the present invention that integrates the soft-switched ac-input dual boost converter with the two-switch forward converter.
Figure 24:
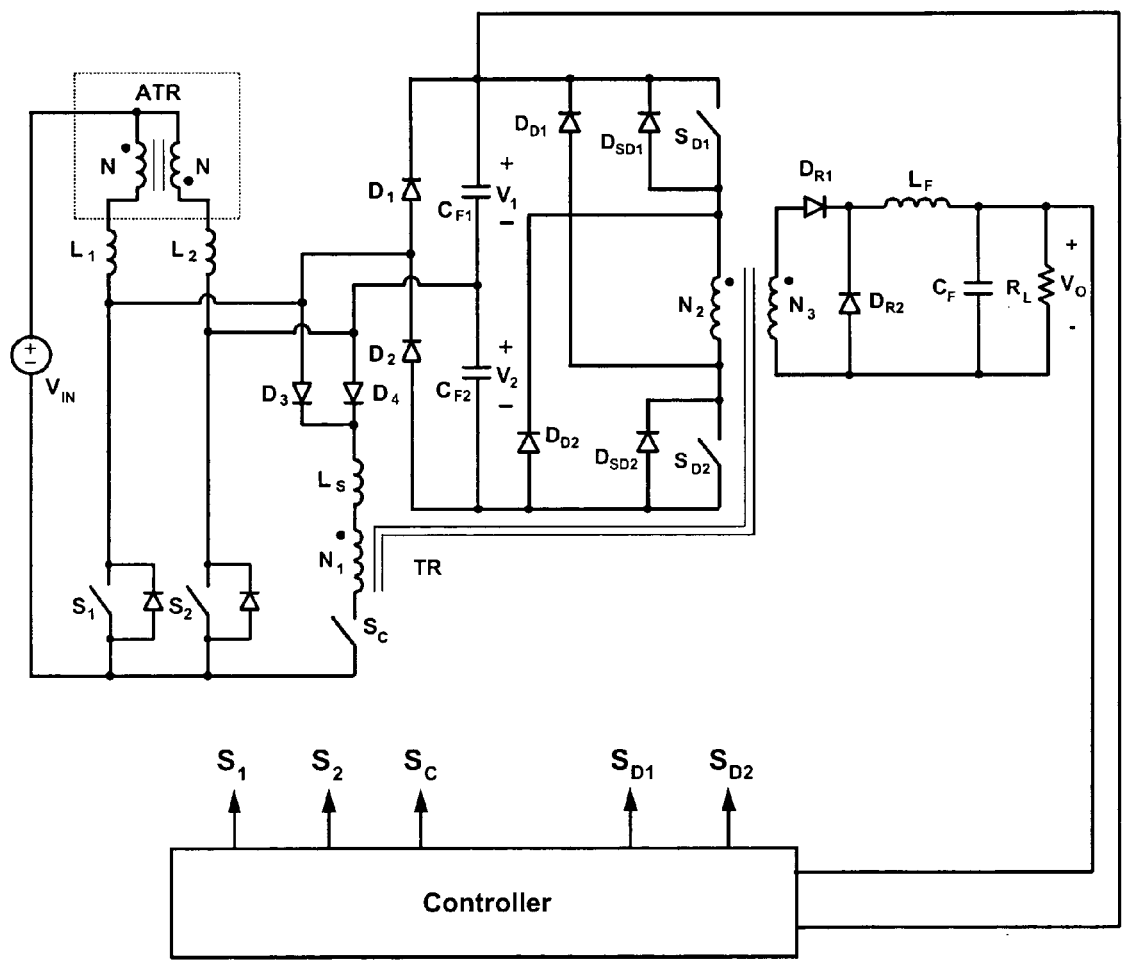
FIG. 24 shows another embodiment of the present invention that integrates the soft-switched dc-input two-inductor boost converter with the two-switch forward converter.

Finally, the concept of this invention can be extended to other input-stage topologies. FIG. 23 shows embodiment of this invention that integrates the soft-switched ac-input dual boost converter with the two-switch forward converter. FIG. 24 shows another embodiment that integrates the soft-switched dc-input two-inductor boost converter with the two-switch forward converter.

Based on the foregoing, it would be appreciated that a single magnetic device is mutually shared by two power conversion stages. Specifically, a transformer is utilized to simultaneously create conditions for soft switching of a front-end power stage and to provide isolation to a downstream DC-DC power stage. In one embodiment, the transformer that is used to create conditions for soft switching is a front-end boost converter with active snubber is integrated with the isolation transformer of the two-switch forward converter DC-DC power stage. In this integrated boost and two-switch forward converter power stages, all active semiconductor switches are soft switched, i.e., the two-switch forward converter is also soft-switched. In another embodiment, the transformer of the front-end boost converter with active snubber is integrated with the isolation transformer of the flyback converter.

We claim:

1. A power system; comprising:
   a first switching power converter having a first output voltage and a first winding coupled to an input power source;
   at least one second switching power converter having a second output voltage and a second winding coupled to at least one load,
   a controller that produces a first control signal for regulating the first output voltage and a second control for regulating the second output voltage, wherein the first switching power converter comprises at least one first switch responsive to the first control signal and the at least one second switching power converter comprises at least one second switch responsive to the second control signal, said first control signal and second control signal having different timings relative to each other; and
   a magnetic device comprising a single integrated magnetic core that couples the first winding to the second winding for creating at least one of ZVS or ZCS conditions for the first and second switch.

2. The power system of claim 1, wherein the different timing of said first control signal and the second control signal turns on the at least one first switch and the at least one second switch at substantially the same time and turns off the at least one first switch and the at least one second switch at different substantially times.

3. The power system of claim 1, wherein at least one of the first winding or the second winding comprise a plurality of serially coupled or parallel coupled windings.

4. The power system of claim 1, wherein the first switching power converter comprises at least one of a boost converter, an ac-input dual boost converter, and a dc-input two-inductor boost converter.

5. The power system of claim 4, wherein the boost converter comprises a snubber circuit.

6. The power system of claim 1, wherein the at least one second switching power converter comprises at least one of a front-end power converter, an output power converter, and a power supply.

7. The power system of claim 1, wherein the at least one second switching power converter comprises a plurality of output power converters having cross regulated outputs.

8. The power system of claim 1, wherein the at least one second switching power converter comprises at least one of a two-switch forward converter, a flyback converter, another boost converter, a buck converter, a buck-boost converter, SEPIC converter, a dual of SEPIC converter, and a CUK converter.

9. The power system of claim 1, wherein at least one of the first switching power converter and the at least one second switching power converter comprises at least one of a rectifier, a filter, a boost switch and an auxiliary switch.

10. The power system of claim 9, wherein the rectifier comprises at least one of a secondary-side diode rectifier or a synchronous rectifier.

11. The power system of claim 9, wherein the rectifier comprises at least one diode.

12. The power system of claim 1, wherein the input power source comprises at least one of a DC power source or an AC power source.

* * * * *